United States Patent
Rodriguez

(10) Patent No.: US 7,496,945 B2
(45) Date of Patent: Feb. 24, 2009

(54) INTERACTIVE PROGRAM GUIDE FOR BIDIRECTIONAL SERVICES

(75) Inventor: Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 09/896,470

(22) Filed: Jun. 29, 2001

(65) Prior Publication Data

US 2003/0005447 A1 Jan. 2, 2003

(51) Int. Cl.
*H04N 5/445* (2006.01)
*H04N 7/173* (2006.01)

(52) U.S. Cl. .............................. 725/51; 725/40; 725/86; 725/87

(58) Field of Classification Search .................. 725/40, 725/44–46, 51–53, 86, 87
See application file for complete search history.

(56) References Cited

U.S. PATENT DOCUMENTS

| | | | |
|---|---|---|---|
| 4,528,643 A | 7/1985 | Freeny | |
| 4,706,121 A * | 11/1987 | Young | 348/27 |
| 4,751,578 A | 6/1988 | Reiter et al. | |
| 4,885,775 A | 12/1989 | Lucas | |
| 4,908,713 A | 3/1990 | Levine | |
| 4,949,187 A | 8/1990 | Cohen | |
| 4,963,994 A | 10/1990 | Levine | |
| 4,991,011 A | 2/1991 | Johnson et al. | |
| 5,038,211 A | 8/1991 | Hallenbeck | |
| 5,253,066 A | 10/1993 | Vogel | |
| 5,293,357 A | 3/1994 | Hallenbeck | |
| 5,410,344 A | 4/1995 | Graves et al. | |
| 5,477,262 A | 12/1995 | Banker et al. | |
| 5,479,268 A | 12/1995 | Young et al. | |
| 5,508,815 A | 4/1996 | Levine | |
| 5,532,735 A | 7/1996 | Blahut et al. | |
| 5,565,908 A * | 10/1996 | Ahmad | 725/93 |
| 5,568,272 A | 10/1996 | Levine | |

(Continued)

FOREIGN PATENT DOCUMENTS

EP 0763936 3/1997

(Continued)

OTHER PUBLICATIONS

Wikipedia, Moxi, retrieved on Aug. 14, 2008 at http://en.wikipedia.org/wiki/Moxi.

(Continued)

*Primary Examiner*—John W Miller
*Assistant Examiner*—Sumaiya A Chowdhury

(57) ABSTRACT

The present invention provides methods and systems for accessing services in a television system. In one embodiment, a DHCT presents a subscriber an EPG presentation containing a plurality of selectable bi-directional services that are purchasable for a period of time and rendered to a buying subscriber on an individualized basis as offered by the cable television system. The subscriber navigates an EPG menu presentation with an input device such as a remote control device and selects a purchasable service by choosing the visual representation that corresponds to the desired service. The DHCT receives the user input, translates the selected command into an executable program call that queries service availability and, if the service is available, initiates the selected bi-directional audiovisual service on a personalized session.

11 Claims, 20 Drawing Sheets

| BI-DIRECTIONAL SERVICES PROGRAMMING GUIDE | MARCH 23, 2001 | | 8:37 PM |
|---|---|---|---|
| CHANNEL | SERVICE DESCRIPTION | AVAILABLE | NEXT AVAILABLE |
| 100 | WORKOUT WITH A PERSONAL TRANNER FROM GOLD'S GYM... | YES | |
| 101 | BALLY'S GYM EXERCISES | YES | |
| 102 | WORKOUT WITH NINA | NO | APPROX 20 MINUTES |
| 103 | GET RICH QUICK SEMINAR | IN PROGRESS | 2 HOURS,23 MINUTES |
| 104 | PERSONAL SHOPPER - MACY'S | YES | |
| 105 | PERSONAL SHOPPER - SEARS | NO | 13 MINUTES |

U.S. PATENT DOCUMENTS

| | | | |
|---|---|---|---|
| 5,579,055 A | 11/1996 | Hamilton et al. | 348/476 |
| 5,585,838 A | 12/1996 | Lawler et al. | 348/13 |
| 5,619,247 A | 4/1997 | Russo | |
| 5,629,733 A | 5/1997 | Youman et al. | 348/7 |
| 5,654,747 A | 8/1997 | Ottesen et al. | |
| 5,666,645 A | 9/1997 | Thomas et al. | 455/6 |
| 5,677,905 A | 10/1997 | Bigham et al. | |
| 5,682,597 A | 10/1997 | Ganek et al. | |
| 5,699,107 A * | 12/1997 | Lawler et al. | 725/58 |
| 5,745,837 A | 4/1998 | Fuhrmann | |
| 5,751,282 A | 5/1998 | Girard et al. | |
| 5,764,899 A | 6/1998 | Eggleston et al. | |
| 5,771,435 A * | 6/1998 | Brown | 725/87 |
| 5,790,935 A | 8/1998 | Payton | |
| 5,802,502 A | 9/1998 | Gell et al. | |
| 5,809,204 A | 9/1998 | Young et al. | |
| 5,835,843 A * | 11/1998 | Haddad | 725/115 |
| 5,838,314 A | 11/1998 | Neel et al. | |
| 5,856,975 A | 1/1999 | Rostoker et al. | |
| 5,905,522 A | 5/1999 | Lawler | |
| 5,915,068 A | 6/1999 | Levine | |
| 5,917,822 A | 6/1999 | Lyles et al. | |
| 5,943,047 A | 8/1999 | Suzuki | |
| 5,990,881 A | 11/1999 | Inoue et al. | |
| 5,990,927 A | 11/1999 | Hendricks et al. | |
| 6,006,257 A | 12/1999 | Slezak | |
| 6,035,281 A | 3/2000 | Crosskey et al. | |
| 6,055,571 A * | 4/2000 | Fulp et al. | 709/224 |
| 6,057,872 A | 5/2000 | Candelore | |
| 6,088,455 A | 7/2000 | Logan et al. | |
| 6,108,002 A * | 8/2000 | Ishizaki | 725/58 |
| 6,118,976 A | 9/2000 | Arias et al. | |
| 6,157,377 A | 12/2000 | Nazaroff et al. | |
| 6,253,375 B1 | 6/2001 | Gordon et al. | |
| 6,305,020 B1 | 10/2001 | Hoarty et al. | |
| 6,401,243 B1 | 6/2002 | Suzuki | |
| 6,484,318 B1 | 11/2002 | Shioda et al. | |
| 6,532,593 B1 | 3/2003 | Moroney | |
| 6,543,053 B1 | 4/2003 | Li et al. | |
| 6,594,826 B1 | 7/2003 | Rao et al. | |
| 6,681,396 B1 * | 1/2004 | Bates et al. | 725/58 |
| 6,697,376 B1 | 2/2004 | Son et al. | |
| 6,701,528 B1 | 3/2004 | Arsenault et al. | |
| 6,732,366 B1 * | 5/2004 | Russo | 725/5 |
| 6,732,369 B1 * | 5/2004 | Schein et al. | 725/39 |
| 6,754,904 B1 * | 6/2004 | Cooper et al. | 725/32 |
| 6,760,918 B2 | 7/2004 | Rodriguez et al. | |
| 6,772,433 B1 * | 8/2004 | LaJoie et al. | 725/52 |
| 6,986,156 B1 | 1/2006 | Rodriguez et al. | |
| 7,010,801 B1 | 3/2006 | Jerding et al. | |
| 7,246,367 B2 * | 7/2007 | Iivonen | 725/102 |
| 7,340,759 B1 | 3/2008 | Rodriguez et al. | |
| 2001/0044744 A1 | 11/2001 | Rhoads | |

FOREIGN PATENT DOCUMENTS

| | | |
|---|---|---|
| EP | 0891084 | 1/1999 |
| WO | 98/39893 | 9/1998 |

OTHER PUBLICATIONS

Law Office Computing, AportisDoc Mobile Edition 2.2, retrieved on Aug. 14, 2008 at http://www.lawofficecomputing.com/old_site/Reviewsdata/dj01/aportisdoc.asp.

* cited by examiner

| CHANNEL | 2:00 PM | 2:30 PM | 3:00 PM | 3:30 |
|---|---|---|---|---|
| 200 | INTRODUCTION TO LAW SEMINAR | | | |
| 201 | ◀◀ GET RICH QUICK CLASSES | | | |
| 202 | ◀◀ TALK LIVE WITH A FORD MECHANIC | | | |
| 203 | LADY LUCINDA'S PSYCHIC HOTLINE | | DOOLITTLE'S VETERINARIANS | |

BI-DIRECTIONAL SERVICES PROGRAMMING GUIDE

CURRENT TELEVISION PROGRAM

*Fig. 12*

| BI-DIRECTIONAL SERVICES PROGRAMMING GUIDE | MARCH 23, 2001 | | 8:37 PM |
|---|---|---|---|
| CHANNEL | SERVICE DESCRIPTION | AVAILABLE | NEXT AVAILABLE |
| 100 | WORKOUT WITH A PERSONAL TRAINER FROM GOLD'S GYM... | YES | |
| 101 | BALLY'S GYM EXERCISES | YES | |
| 102 | WORKOUT WITH NINA | NO | APPROX 20 MINUTES |
| 103 | GET RICH QUICK SEMINAR | IN PROGRESS | 2 HOURS, 23 MINUTES |
| 104 | PERSONAL SHOPPER - MACY'S | YES | |
| 105 | PERSONAL SHOPPER - SEARS | NO | 13 MINUTES |

Fig. 13

| BI-DIRECTIONAL SERVICES | | |
|---|---|---|
| BALLY'S EXERCISE ROUTINES | MARCH 23, 2001 8:37 PM | |
| AVAILABLE SESSIONS | AVAILABLE | NEXT AVAILABLE |
| ISOMETRICS WITH ISAAC | YES | |
| DEBORAH'S JAZZERCISE | IN PROGRESS | 10:00 PM |
| ROWING WITH THE OLDIES | NO | 10:30 PM |
| TAE-BO BY BILLY | YES | |

| channel | 7:00 PM | 7:30 PM | 8:00 PM | 8:30 |
|---|---|---|---|---|
| etw 301 | Extra | Entertainment News | | Beach |
| ppv 400 | Tae Bo | | BC Tae Bo | BC |
| ABC 1 | ABC News | Entertainment Tonight | Who wants to be a Mil... | |
| FOX 2 | The Drew Carey Show | Home Improvement | Family Guy | Sports |
| WB 3 | The Simpsons | Friends | Buffy The Vampire... | |

TUE 7/1   5:01 PM abc
2

ABC News
7:00 PM - 7:30 PM
Get The Latest News On
Campaign 2000

IPG tue 7/1   [a] browse by   [b] Date   [c]

1670
1676

| | | | | | | | |
|---|---|---|---|---|---|---|---|
| | INTERACTIVE PROGRAM GUIDE ACCESS TO SERVICE GUIDE | | | | | | |
| SG 01 | CURRENT TV PROGRAM | | | | | | |
| SERVICE GUIDE | | | | | | | |
| CHANNEL | ◁ | 2:00 PM | 2:30 PM | 10 | TUE 9/1 | 12:01 PM | |
| ETW 301 | | EXTRA | ENTERTAINMENT NEWS | | | 3:00 PM | 3:30 |
| PPV 400 | ⪡ | SAVING PRIVATE RYAN | | | AMERICAN HISTORY X | | |
| SG 1 | | SERVICE GUIDE | SERVICE GUIDE | | SERVICE GUIDE | SERVIC | ⎫ 1776 |
| ETV 2 | | TALK SOUP | | | E! BEHIND THE SCENES | | |
| TVLD 3 | | ONE LIFE TO LIVE | | | GENERAL HOSPITAL | | |
| TUE 9/1 | △ BROWSE BY | | B DATE | | © ↻ | | |

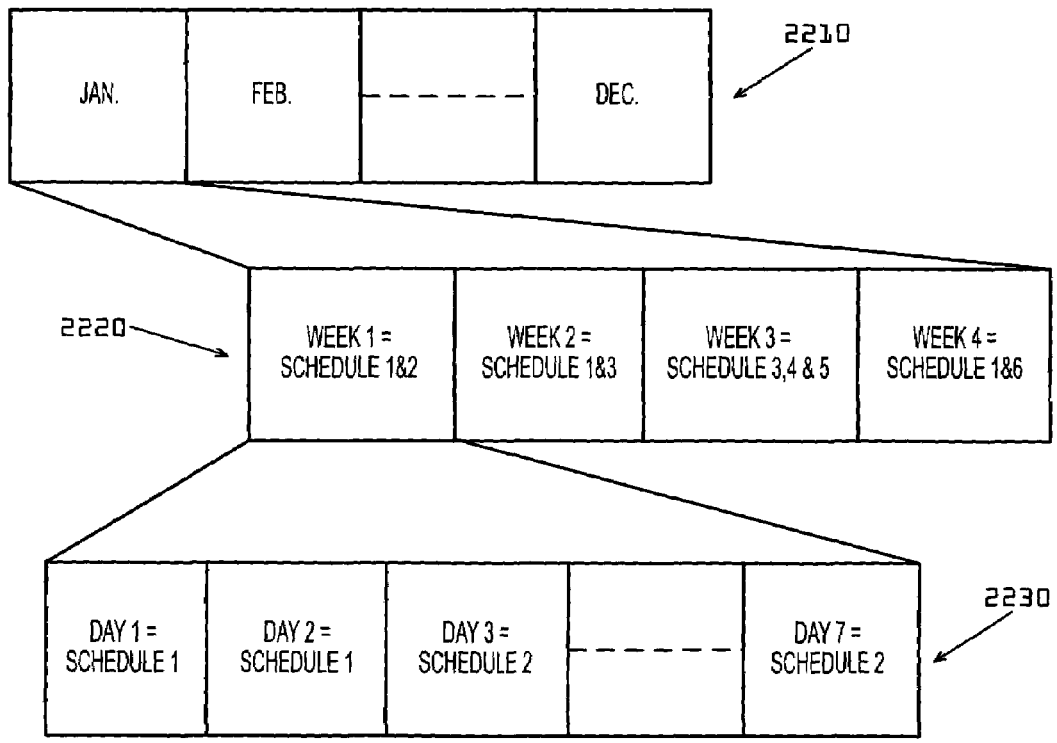

INTERACTIVE PROGRAM GUIDE FOR BIDIRECTIONAL SERVICES

FIELD OF THE INVENTION

This invention relates in general to the field of television systems, and more particularly, to a user interface for accessing bi-directional services in television systems.

BACKGROUND OF THE INVENTION

Historically, television services have been comprised of analog broadcast audio and video signals. Cable television systems now receive broadcasts and retransmit them with other programming to users over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the set top box, has become an important computing device for accessing video services and navigating a subscriber through a maze of available services. In addition to supporting traditional analog broadcast video functionality, digital HCTs (or "DHCTs") now also support an increasing number of services which are not analog, but rather digital; are not basic broadcast, but rather two-way communication such as video-on-demand; and are not basic video, such as e-mail or web browsers. These are all in addition to the host of other television services which are increasingly being demanded by consumers, examples of which include audio and audio/visual programming, advanced navigation controls, impulse pay-per-view technology, and on-line commerce. With the addition of interactive services and the increased bandwidth and the emergence of bi-directional communication capabilities available through a digital television system, there is a need to provide a subscriber new channels and/or services with dedicated bi-directional communication over an allocated period of time.

Each HCT or DHCT (collectively hereinafter "DHCT") is typically connected to a cable or satellite television network. The DHCTs generally include hardware and software necessary to provide the functionality for services rendered by the digital television system at the client's site. Preferably, some of the software executed by a DHCT is downloaded and/or updated via the cable television network. Each DHCT typically includes a processor, communication components and memory, and is connected to one or more audiovisual output devices such a television or other display device or a personal computer. Furthermore, a DHCT is typically connected to input devices such as an infrared wireless remote control or a wired or wireless keyboard and can be connected optionally to an audiovisual input device such as a camcorder with an integrated microphone or to a video camera and a separate microphone. While many conventional DHCTs are stand-alone devices that are externally connected to a television, a DHCT and/or its functionality may be integrated into a television or personal computer, as will be appreciated by those of ordinary skill in the art.

Because hundreds or thousands of services may be offered by a cable television service provider, an electronic program guide (EPG) is necessary to facilitate searching for programs, accessing of program information and marketing of purchasable services such as Pay-Per-View (PPV). However, EPGs are provisioned for traditional broadcast services and not for a new breed of services based on bi-directional audio and/or visual communication that can be offered on an individualized basis to a subscriber. Furthermore, the scope of system resource consumption for bi-directional audiovisual services differs from traditional broadcast services and from recent interactive services, such as video-on-demand, that don't require bi-directional audiovisual communication. Therefore, there is a need for the DHCT to not only provide the services and applications that the cable television system provider offers, but also to provide access to bi-directional communication services and respective service information via an EPG. As system operators of cable television systems continue to add services and applications, a problem exists in both making the subscriber aware of and also in providing quick access to the new services and channels. Because of the large number of subscribers in a cable television network, the large number of bi-directional communication services offered, the fact that each service may be distinct and individually rendered, a problem exists in providing a subscriber a quick and efficient method to access these services. Further, there is a need to provide respective program or service information as well as the ability to search service availability and obtain service information.

SUMMARY OF THE INVENTION

Briefly described, a preferred embodiment of the present invention provides a method and system for accessing services in a television system. In one implementation, a digital home communication terminal (DHCT) presents a subscriber an EPG presentation including a plurality of selectable bi-directional services that are purchasable for a period of time and rendered to a buying subscriber on an individualized basis as offered by the cable television system. The subscriber navigates an EPG menu presentation with an input device such as a remote control device and selects a purchasable service by choosing the visual representation that corresponds to the desired service. The DHCT receives the user input, translates the selected command into an executable program call that queries service availability and, if the service is available, initiates at an appropriate point in time the selected bi-directional audiovisual service on a personalized session.

In accordance with one embodiment of the present invention, a method for accessing a plurality of bi-directional services over a cable network is described, comprising presenting a program guide to at least one subscriber, wherein the program guide displays bi-directional services, populating a bi-directional services database with information related to the bi-directional services displayed in the program guide, receiving a request from a subscriber for a bi-directional services displayed in the guide, querying the bi-directional database to determine whether the requested service is available, rendering the bi-directional service requested by the subscriber, and updating the bi-directional database to reflect that the bi-directional service requested by the subscriber has been rendered.

In accordance with another described embodiment, the bi-directional service comprises a bi-directional communication session between the subscriber and a content provider. In another embodiment, the bi-directional service comprises a bi-directional communication between two or more subscribers.

In another embodiment of the present invention, the bi-directional communication comprises a plurality of instantiations of a bi-directional service offered by a content provider.

And in still another embodiment, determining whether a bi-directional service is available comprises querying the bi-directional services database to determine whether an instantiation of the bi-directional service requested by the subscriber is available. Still other embodiments comprise a bi-directional service request for future consumption and a notification to the subscriber when a requested service is unavailable.

In another disclosed embodiment in accordance with the present invention, a method for accessing a plurality of bi-directional services over a cable television network is described, comprising populating a bi-directional services database with information related to a plurality of bi-directional services, sending the bi-directional services database to a home terminal of a first subscriber, presenting a program guide of bi-directional services to the first subscriber, receiving a request from the first subscriber for one of the displayed bi-directional services, querying the bi-directional services database to determine the availability of the requested bi-directional service, rendering the bi-directional service requested by the first subscriber, updating the bi-directional services database to reflect that the bi-directional service requested by the first subscriber has been rendered, and transmitting the updated bi-directional services database to a second subscriber.

In accordance with another described embodiment of the present invention, populating the bi-directional services database includes populating an availability table of entries, each entry associated with a bi-directional service and each entry indicating whether the associated bi-directional service is available. In another embodiment, the availability of a requested bi-directional service is determined by querying the associated availability table entry for the requested bi-directional service. In still another embodiment, the availability table of entries is updated to reflect that a bi-directional services has been rendered to the first subscriber and the availability table of entries is transmitted to the second subscriber.

In accordance with still another embodiment of the present invention, a system is described for providing a bi-directional services programming guide over a cable television network, comprising a bi-directional services content provider, a headend in communication with a hybrid-coax network and the bi-directional services content provider, a bi-directional communications server, configured to establish bi-directional communication between the bi-directional services content provider and the headend, a home communication terminal in communication with a display device and in communication with the headend via the hybrid-coax network, a bi-directional services program guide application server in communication with the bi-directional communications server and configured to establish bi-directional communication between the headend and the home communication terminal, and a bi-directional services program guide application residing on the home communication terminal and in communication with the bi-directional services program guide application server, configured to generate the bi-directional services programming guide on the display device and to establish bi-directional communications between the bi-directional services content provider and the home communications terminal.

In still another disclosed embodiment, a system is described that has a bi-directional services database in communication with the bi-directional services program guide client application, wherein the bi-directional services database stores information pertaining to bi-directional services for presentation via the display device. In one described embodiment, the bi-directional services database includes an availability table of entries, each entry respectively associated with a bi-directional service and each entry indicating whether the associated bi-directional service is available.

Many objects, features and advantages of the present invention will become apparent to one of ordinary skill in the art upon examination of the following drawings and detailed description.

BRIEF DESCRIPTION OF THE DRAWINGS

Figure 1:
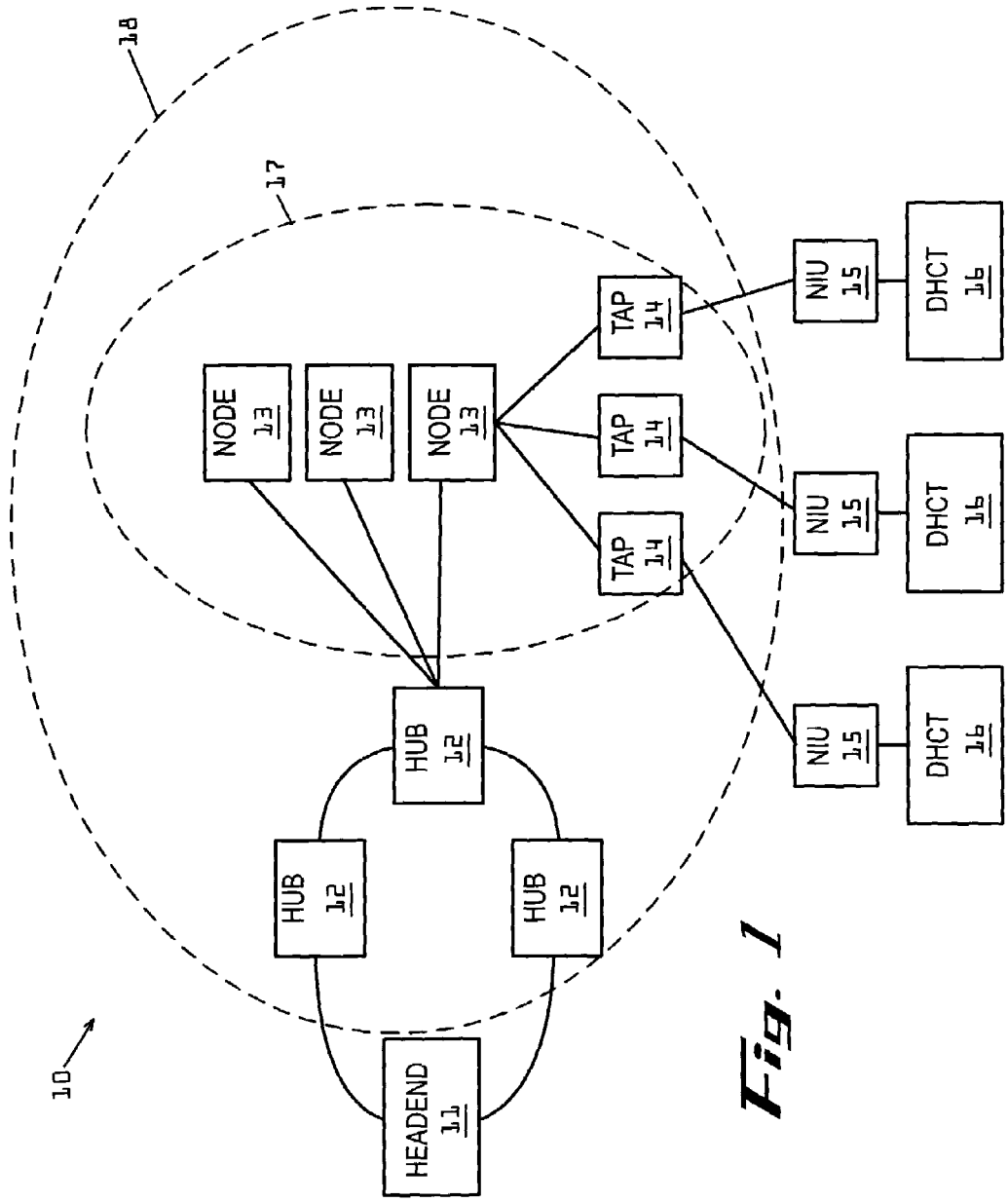

Having thus described the invention in general terms, reference will now be made to the accompanying drawings, which are not necessarily drawn to scale, and wherein:

FIG. 1 is a high-level block diagram view of a cable television network in accordance with an embodiment of the present invention.

Figure 2:
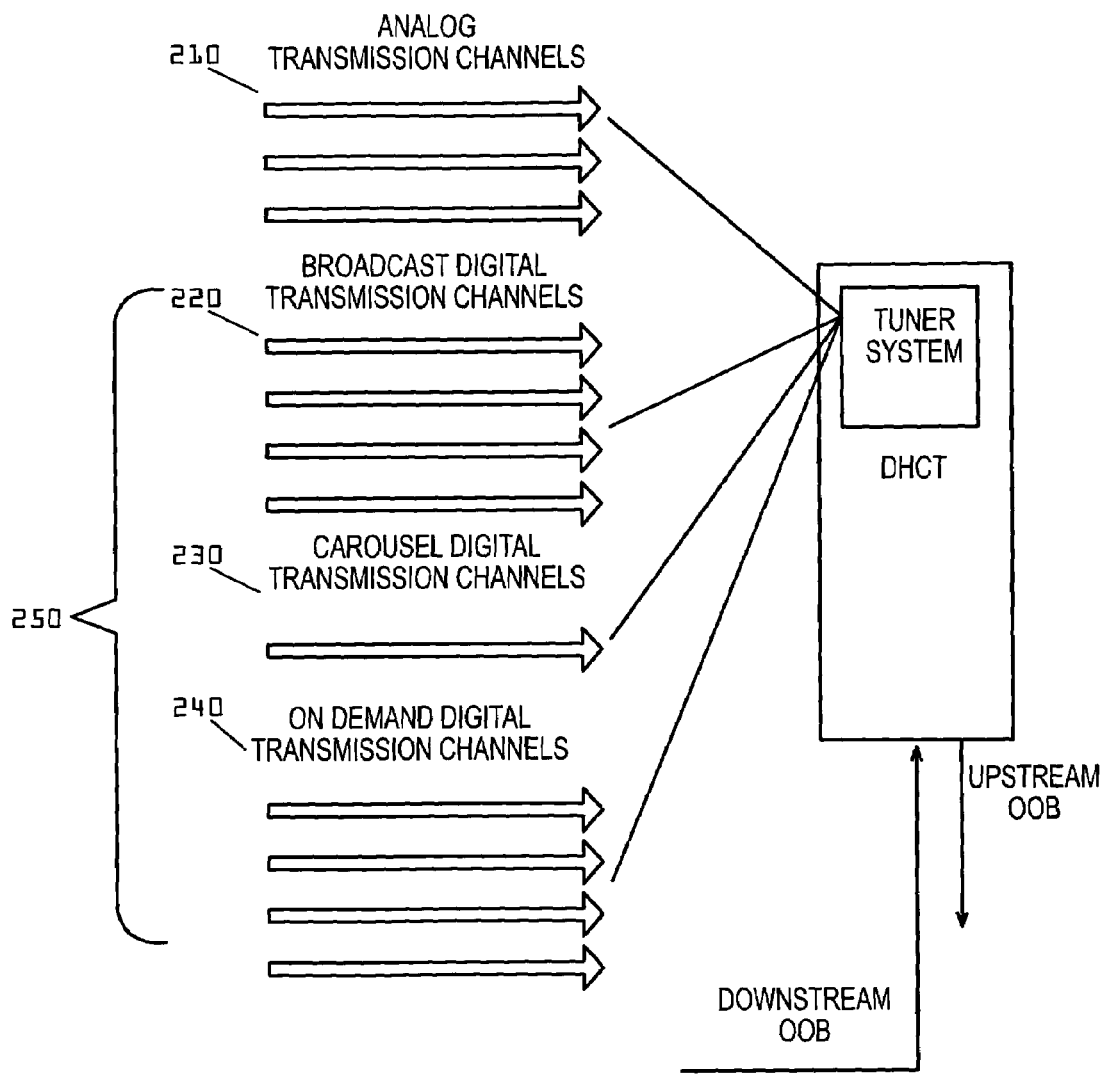
Figure 1:
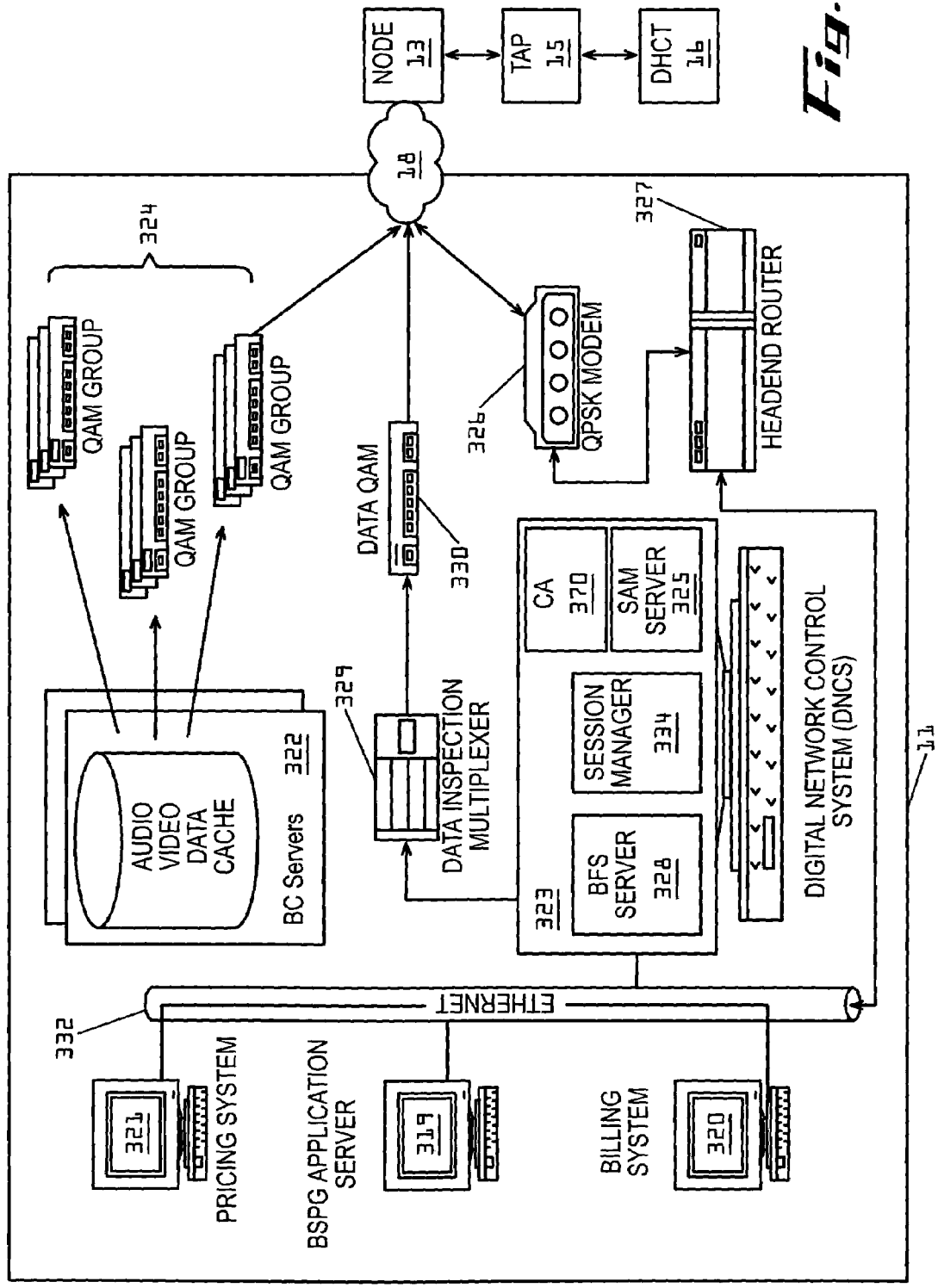

FIG. 2 illustrates the transmission channels supported by a cable television network in accordance with an embodiment of the present invention.

FIG. 3 is a block diagram that illustrates select components of a headend in accordance with an embodiment of the present invention.

Figure 4:
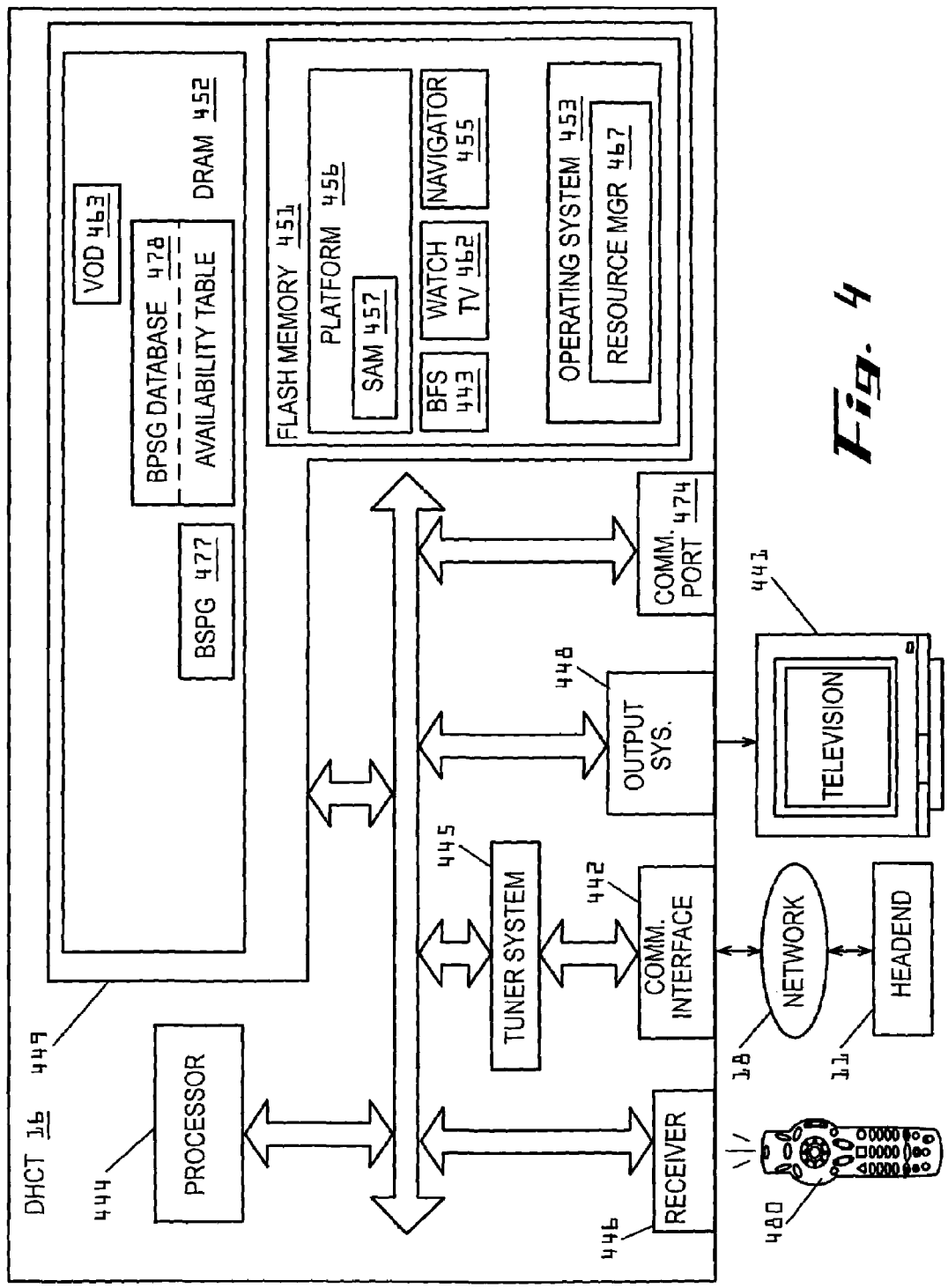

FIG. 4 is a block diagram that illustrates select components of a digital home communication terminal in accordance with an embodiment of the present invention.

Figure 5:
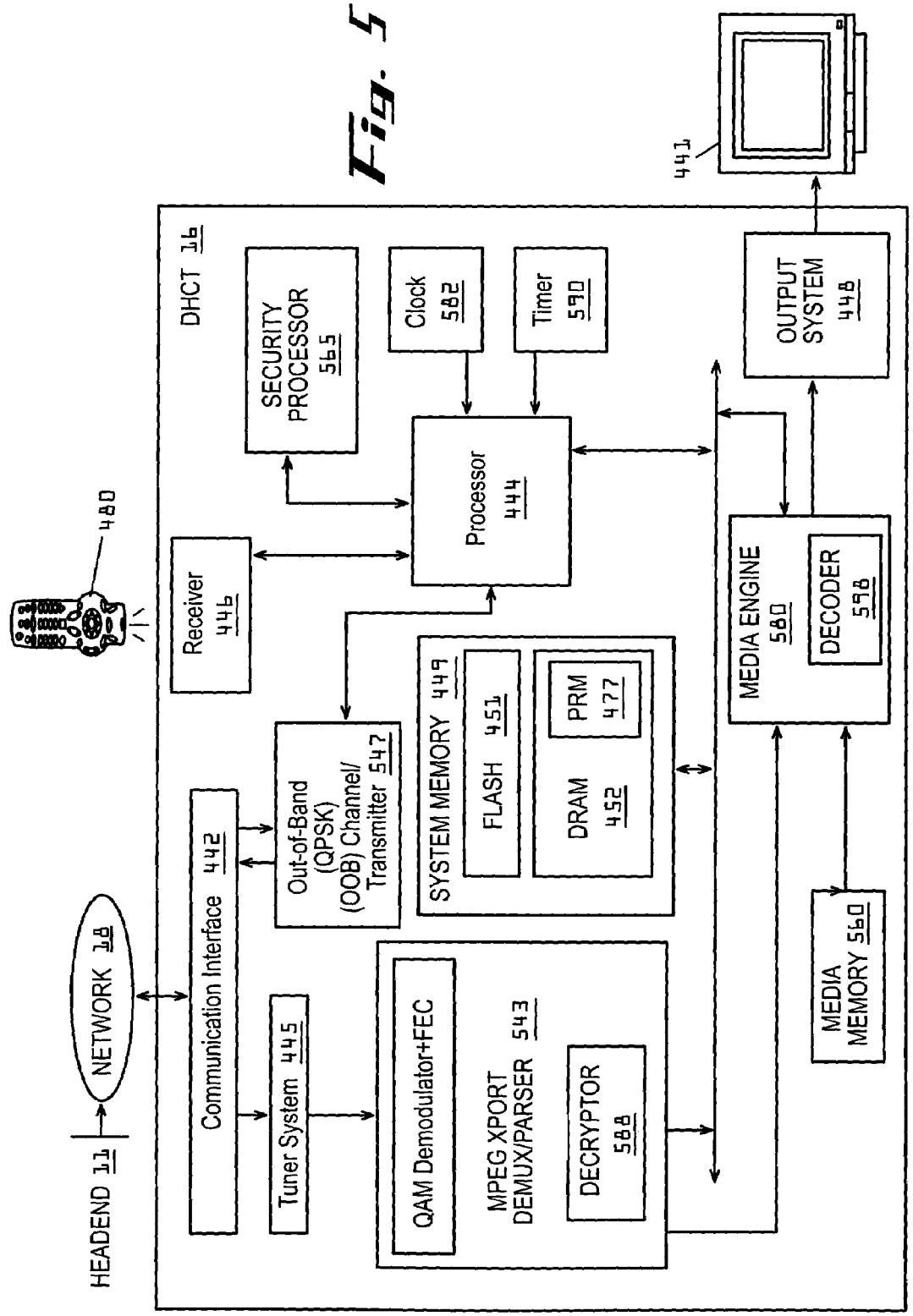

FIG. 5 is another block diagram that depicts select components of a digital home communication terminal in accordance with an embodiment of the present invention.

Figure 6:
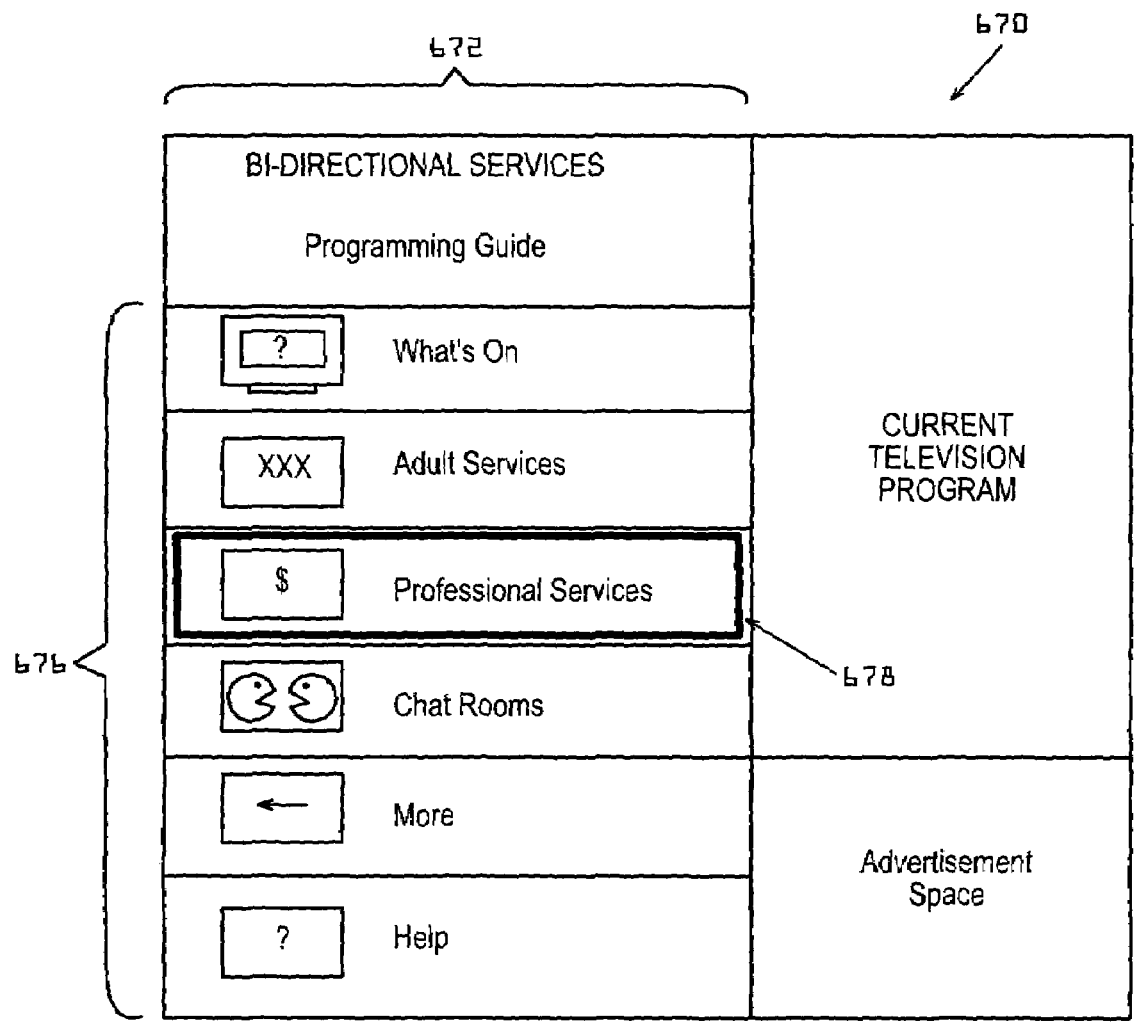

FIG. 6 illustrates one bi-directional services program guide presentation in accordance with an embodiment of the present invention.

Figure 7:
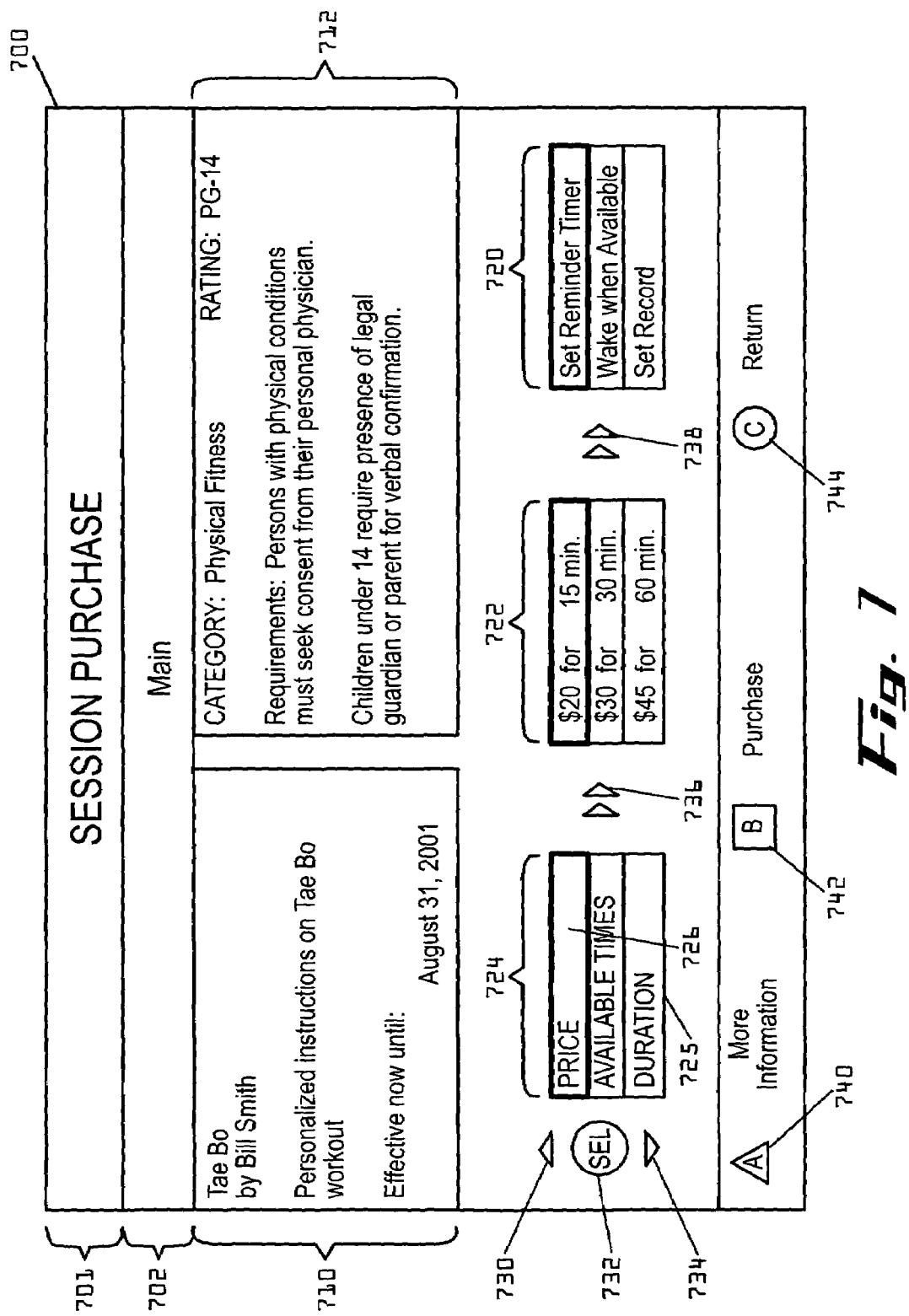

FIG. 7 illustrates a bi-directional services purchase screen in accordance with an embodiment of the present invention.

Figure 8:
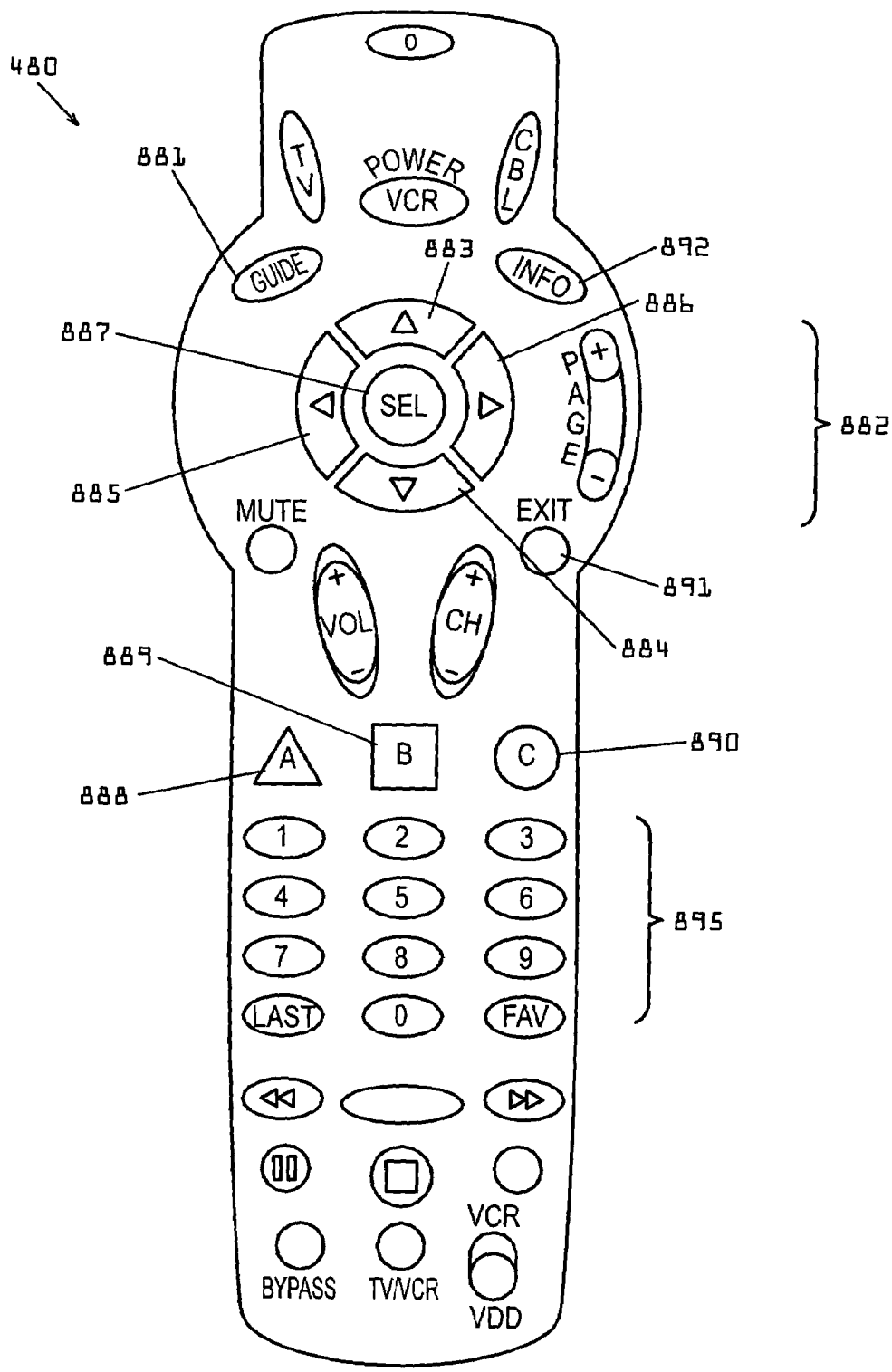

FIG. 8 illustrates a remote control device in accordance with an embodiment of the present invention.

Figure 9:
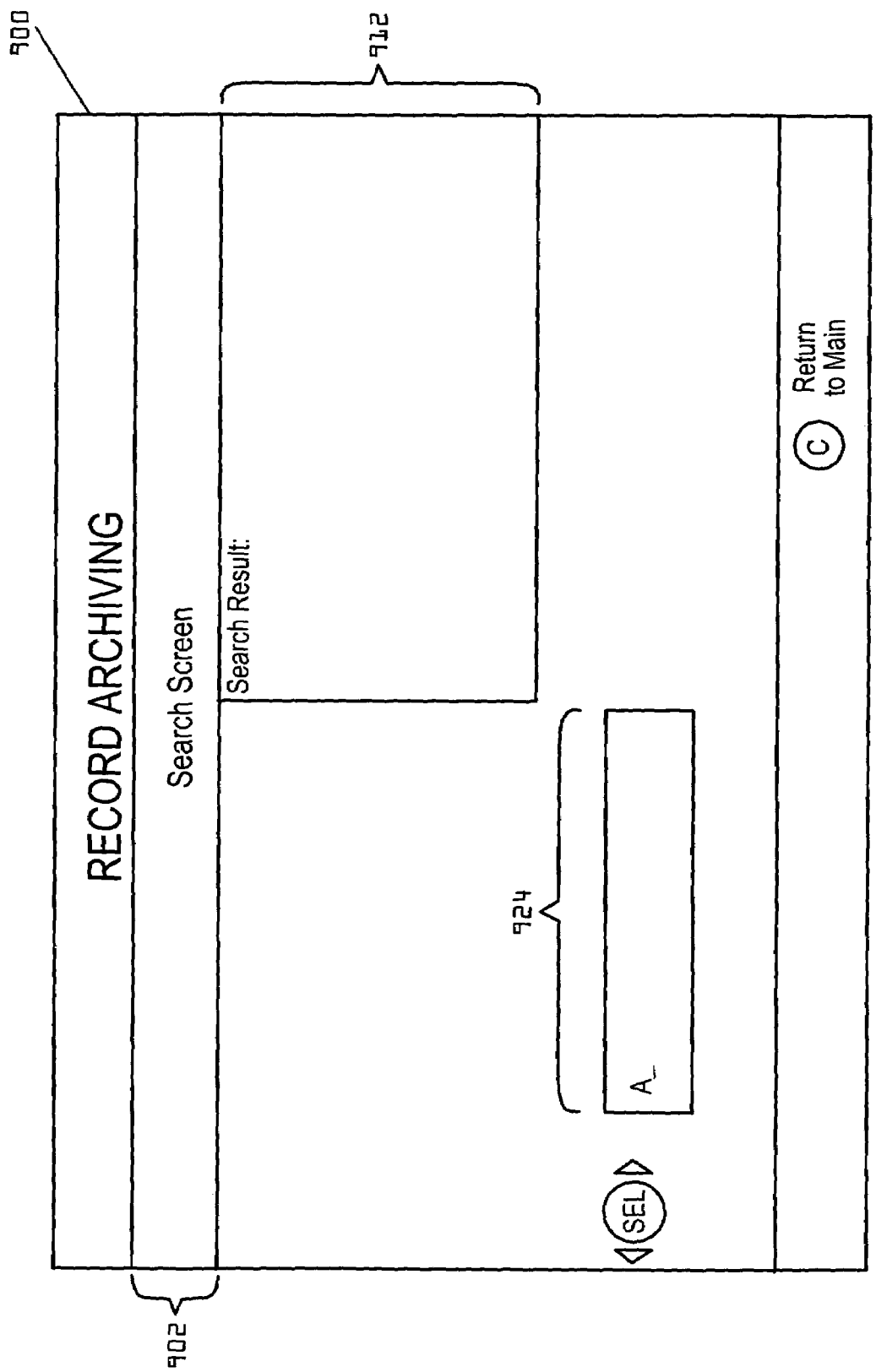

FIG. 9 illustrates an archive search screen in accordance with an embodiment of the present invention.

Figure 10:
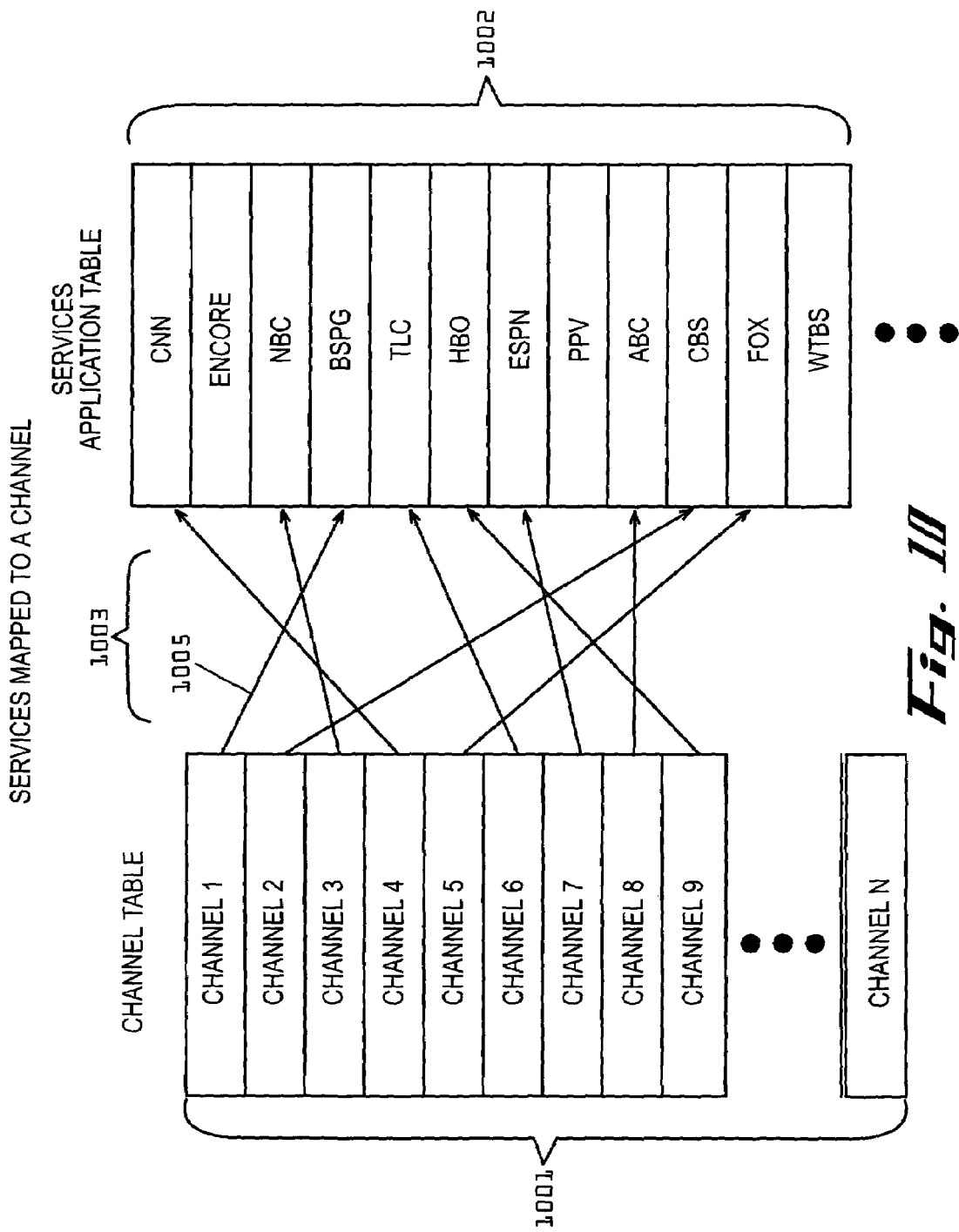

FIG. 10 is a diagram of the mappings of services to channels in accordance with an embodiment of the present invention.

Figure 11:
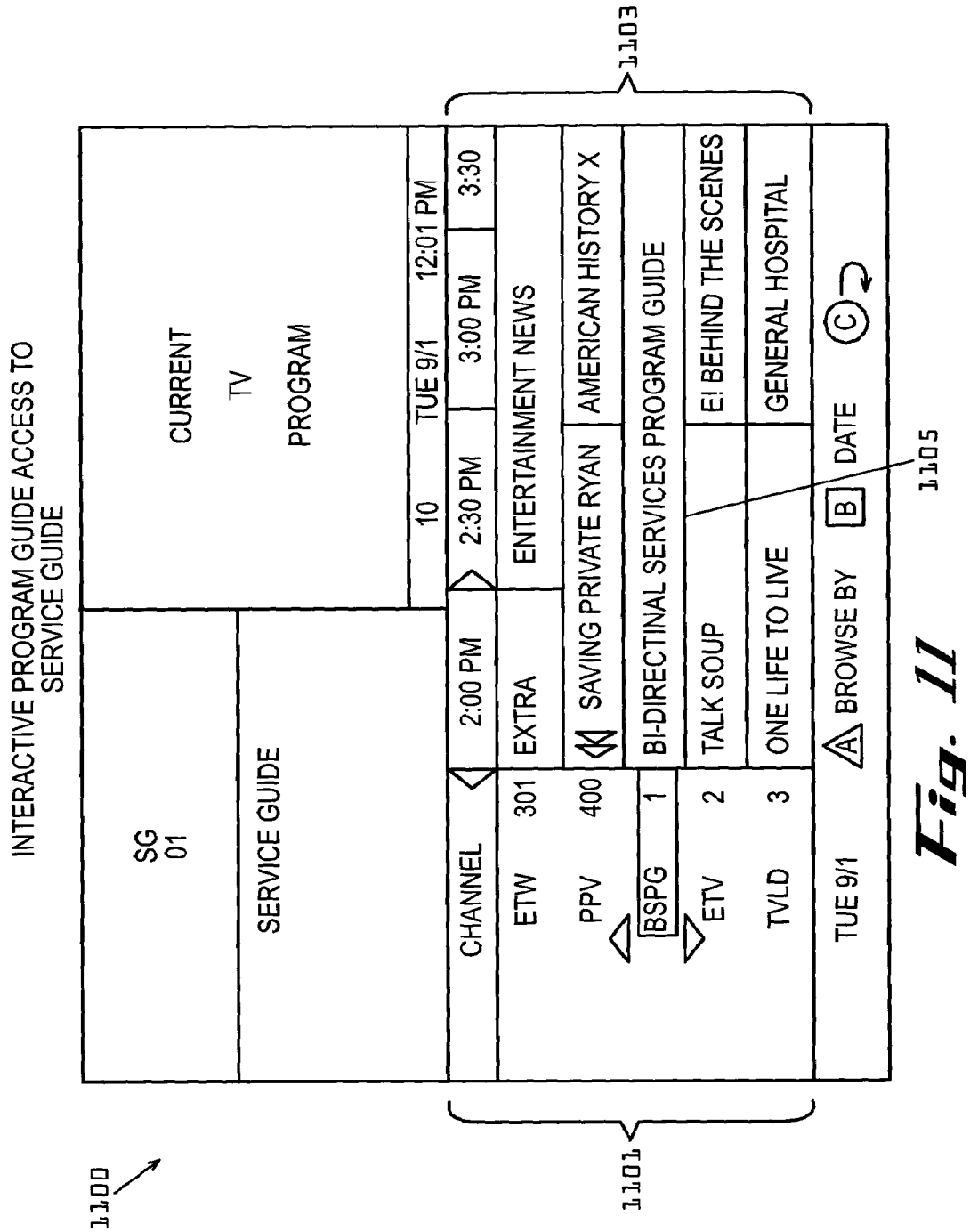

FIG. 11 illustrates a combination presentation screen of an interactive program guide display that includes a bi-directional services guide presentation in accordance with an embodiment of the present invention.

FIG. 12 illustrates a bi-directional services program guide presentation in accordance with an embodiment of the present invention.

FIG. 13 illustrates bi-directional services program guide presentation in a full screen format in accordance with an embodiment of the present invention.

FIG. 14 illustrates a bi-directional services program guide presentation that shows several instantiations of a selected bi-directional service.

Figure 15:
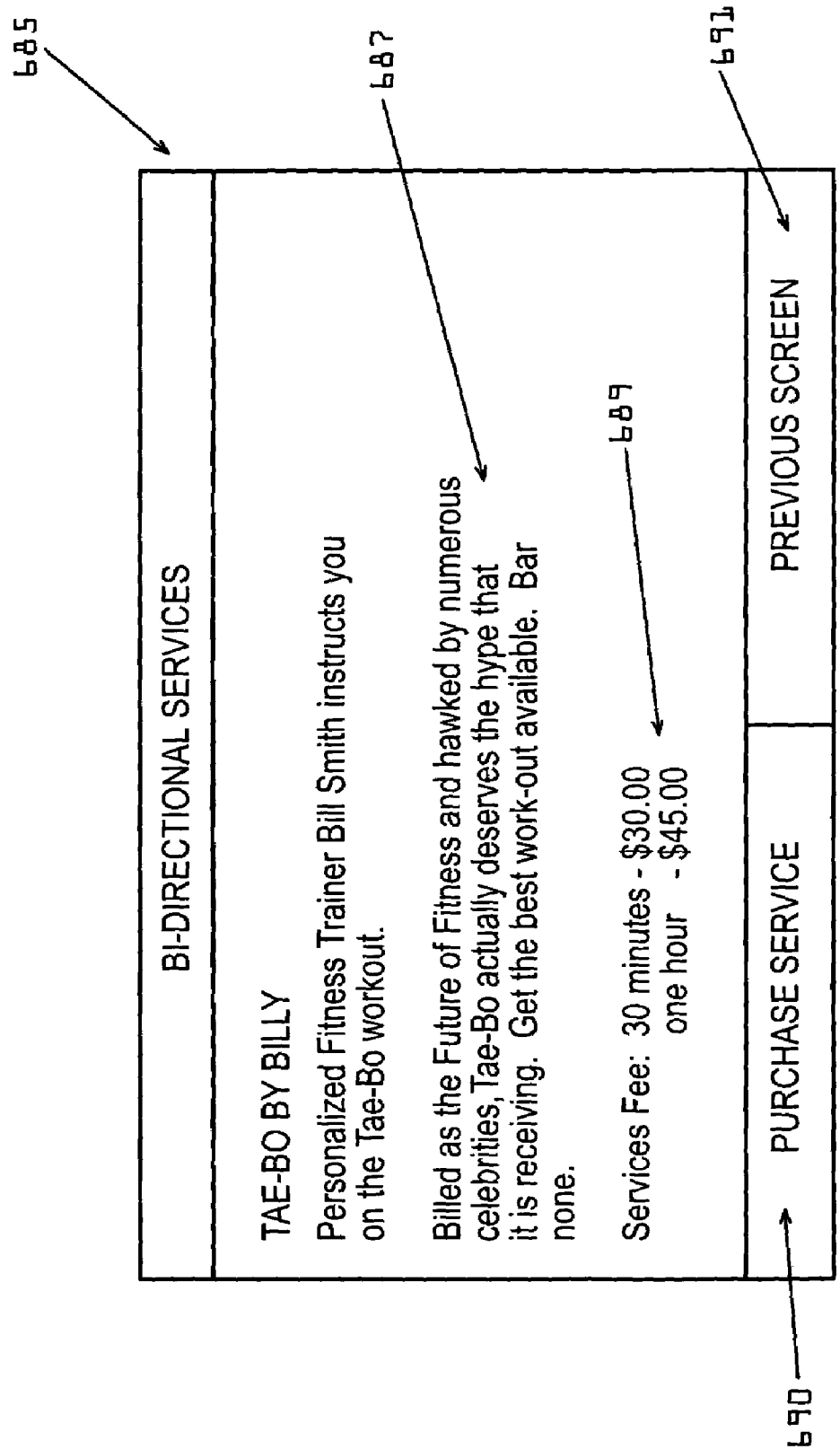

FIG. 15 illustrates a bi-directional services program guide information page in accordance with an embodiment of the present invention.

FIG. 16 illustrates an interactive program guide using icons to denote bi-directional services offerings in accordance with an embodiment of the present invention.

FIG. 17 illustrates an interactive program guide with a selectable service guide in accordance with an embodiment of the present invention.

Figure 18:
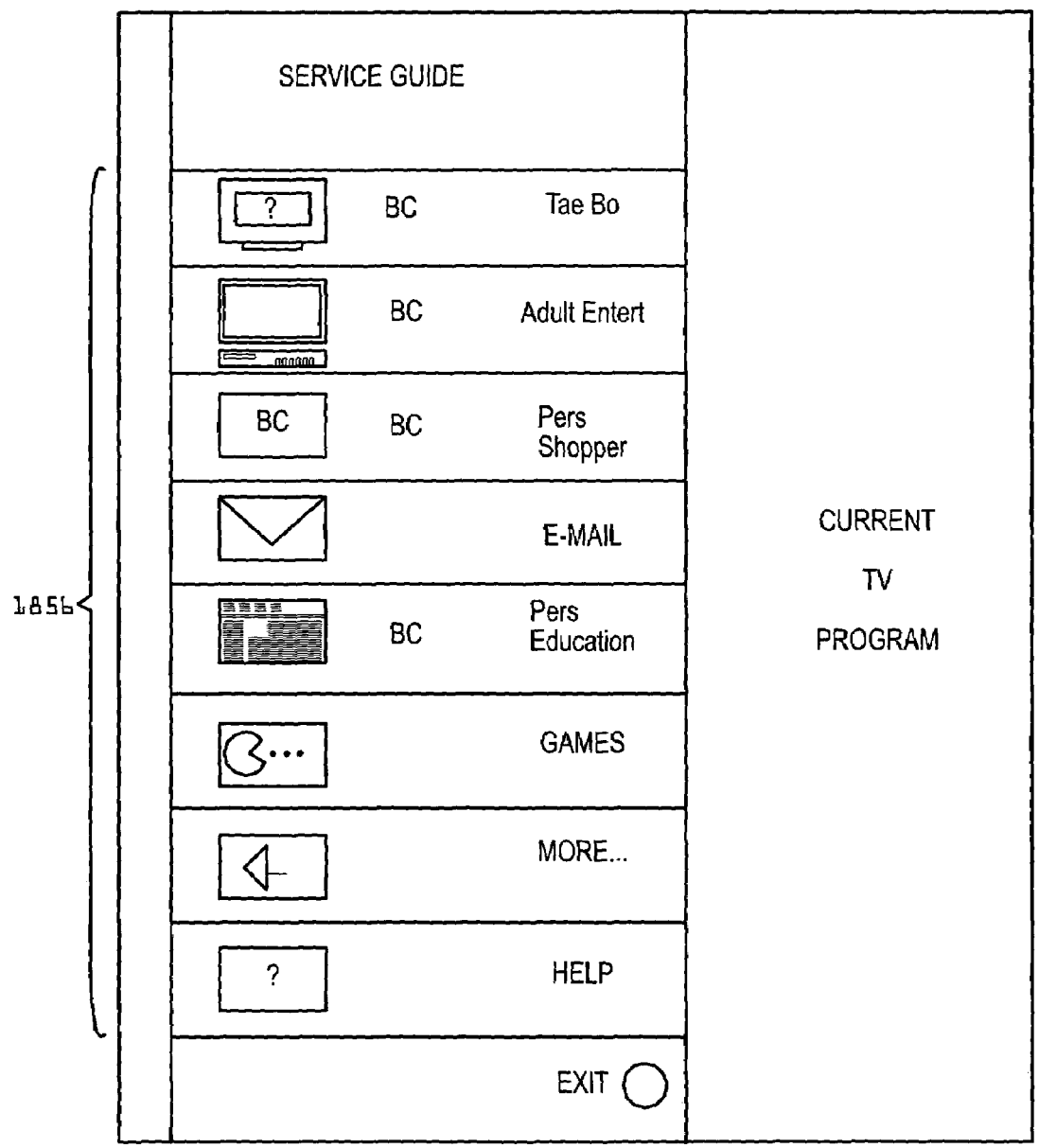

FIG. 18 illustrates a service guide that lists bi-directional services in accordance with an embodiment of the present invention.

Figure 19:
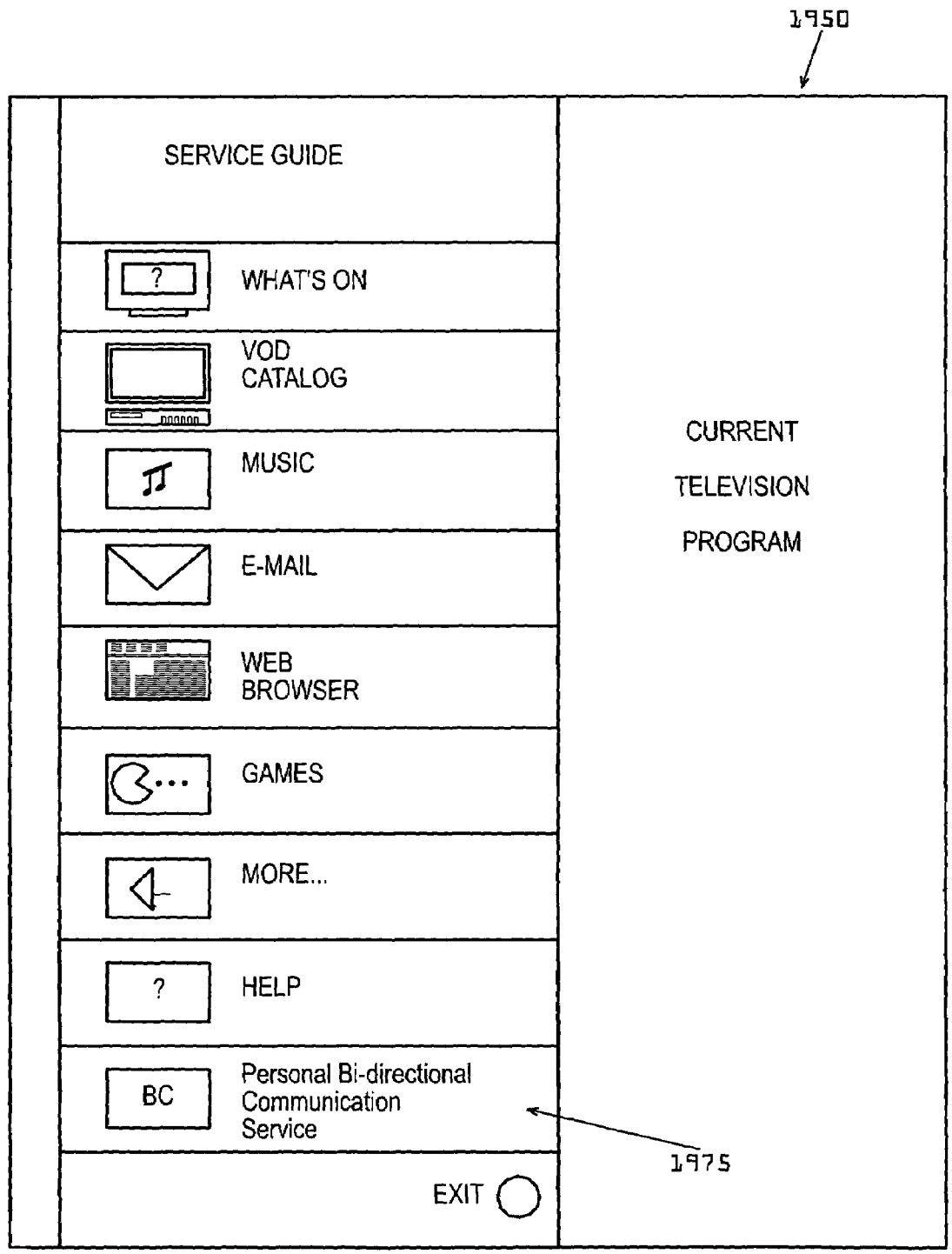

FIG. 19 illustrates a service guide that includes bi-directional services as a selectable service entity in accordance with an embodiment of the present invention.

FIG. 20 illustrates a bi-directional services purchase screen in accordance with an embodiment of the present invention.

FIG. 21 illustrates a PIN entry window in accordance with an embodiment of the present invention.

FIG. 22 illustrates a schedule allocation of system resources in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention is generally implemented as part of a cable television system (CTS). Hence, an illustrative CTS 10 and its operation will be described initially. FIG. 1 shows a block diagram view of a CTS 10, which is generally a reliable and integrated network system that features video, audio, voice and data services to subscribers or DHCT users. Although FIG. 1 depicts a high level view of a CTS 10, it should be appreciated that a plurality of cable television systems can tie together a plurality of regional networks into an integrated global network so that DHCT users can receive content or services from anywhere in the world.

The CTS 10 delivers broadcast video signals as digitally formatted signals in addition to delivering traditional broadcast analog video signals. Furthermore, the system can support one-way broadcast services as well as both one-way data services and two-way media and data services. The two-way operation of the network allows for user interactivity with services, such as Pay-Per-View programming, Near Video-On-Demand (NVOD) programming (according to any of several known NVOD implementation methods), Video-on-Demand (VOD) programming (according to any of several known VOD implementation methods), and interactive applications, such as Internet connections and interactive services that render real-time bi-directional communication on a personalized basis such as bi-directional audio-visual communication. The CTS 10 also provides the interfaces, network control, transport control, session control, and servers to access content and services, and distributes content and services to DHCT users. The CTS 10 also provides the interfaces, network control, transport control, session control, and servers to establish on-demand session-based bi-directional communication service between a particular remote destination and a DHCT user for delivering media from the particular remote destination to the DHCT user and input information from the DHCT user to the particular remote destination. A remote destination during a session of a bi-directional communication service may comprise a remote personal destination such as a friend or a remote vendor that offers a bi-directional communication service for a purchasable period of time in which a viewer communicates real-time with the vendor on a personal basis. In either case, dedicated CTS resources are allocated to fulfill individualized bi-directional communication over a purchasable period.

As shown in FIG. 1, a typical CTS 10 comprises a headend 11, hubs 12, a hybrid fiber-coax (HFC) network 17, and users' DHCTs 16 (hereinafter the terms "user" and "subscriber" are used interchangeably). It should be appreciated that although a single component (e.g., a headend) is illustrated in FIG. 1, a CTS 10 may feature a plurality of any one of the illustrated components or may be configured with alternative embodiments for any one of the individual components or with yet other additional components not enumerated above. A content provider (not shown) transmits information pertaining to purchasable bi-directional communication services to a headend for further downstream transmission to subscribers in the network.

A bi-directional communication type of service purchasable as an individualized service by a DHCT user may be provided by one or more service providers via communication with one or more external communication interfaces in headend 11.

Content provided by a content provider is retrieved and communicated by a cable operator or communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 that is connected to a network interface unit (NIU) 15, which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

FIG. 2 shows the transmission channels supported by the CTS 10 illustrated in FIG. 1, as delivered by the headend 11 and received as input channels by the DHCT 16. Although one DHCT 16 and one headend 11 are illustrated, it is understood by those skilled in the art that more than one of each may be included in a subscriber network television system. As indicated in FIG. 2, the subscriber network television system can simultaneously support a number of transport channel types and modulation formats. The ability to carry analog and digital signals over a large bandwidth are characteristics of a hybrid fiber-coax network typically employed in a subscriber network television system. As will be appreciated by those skilled in the art, analog and digital signals in HFC networks can be multiplexed using frequency division multiplexing (FDM), which enables many different types of signals to be transmitted over the subscriber network television system to the DHCT 16 of the preferred embodiment of the present invention. Typically, a subscriber network television system using HFC supports downstream (i.e. in the direction from the headend 11 to the DHCT 16) frequencies from 50 MHz to 870 MHz, whereas upstream frequencies (i.e. in the direction from the DHCT 16 to higher levels of the system) are in the 5 MHz to 42 MHz band. Generally, the RF channel bandwidth spacing for analog and digital services is 6 MHz. It should be understood that RF channels can be assigned to carry analog video signals but the present embodiment of the invention is not limited to embodiments where an RF channel is assigned to carry analog video signals upon fulfillment of a complete transition of the subscriber network television system to an all digital system.

Referring again to FIG. 2, the downstream direction channels, having been multiplexed using frequency division multiplexing (FDM), and often referred to as in band channels, include Analog Transmission Channels (ATCs) 210 and Digital Transmission Channels (DTCs) 250. These channels carry video, audio, and data services. For a non-limiting example, these channels can carry television signals, Internet data, or any additional types of data, such as bi-directional services program guide (BSPG) data. The signals and data carried on these channels are collectively referred to herein as services. The ATCs 210 are typically broadcast in 6 MHz channels having an analog broadcast composed of analog video and analog audio, and include Broadcast TV Systems Committee (BTSC) stereo and Secondary Audio Program (SAP) audio.

Like the ATCs 210, the DTCs 250 each occupy 6 MHz of the RF spectrum. However, the DTCs 250 are digital channels consisting of 64- or 256-Quadrature Amplitude Modulated (QAM) digital signals formatted as MPEG-2 transport streams, allocated in a separate frequency range. The MPEG-2 transport stream enables transmission of a plurality of DTC channel types over each 6 MHz RF channel, as compared to a 6 MHz ATC 210. Three types of digital transport channels 250 illustrated in FIG. 2 include broadcast digital transmission channels 220, carousel digital transmission channels 230, and on-demand transmission channels 240. MPEG-2 transport may be used to multiplex video, audio, and data in each of these digital transmission channels (DTCs) 220. However, because MPEG-2 transport streams multiplex video, audio, and data to be placed in the same stream, the DTCs 250 do not necessarily have to be allocated in separate 6 MHz RF frequencies, unlike the ATCs 210.

Continuing with FIG. 2, the broadcast DTCs 220 and carousel DTCs 230 typically function as continuous feeds for indefinite time, whereas the on demand DTCs 240 are continuous feed sessions for a limited time. All DTCs 250 are capable of being transmitted at high data rates. The broadcast DTCs 220 carry typical data comprising multiple digitally compressed and formatted, for a non-limiting example, as MPEG-2, TV channels and other continuously fed data information. The carousel DTCs 230 carry broadcast data, such as BSPG data and regular electronic program guide (EPG) data, that is systematically broadcast in a cycling fashion but updated and revised as need be. Thus, the carousel DTCs 230 can serve to carry high volume data, such as EPG data and BSPG data, as well as other data at high data rates. The carousel DTCs 230 typically carry data formatted in directories and files by a Broadcast File System (BFS), which is used for producing and transmitting data streams throughout the CTS 10, and which provides an efficient method for delivery of application executables and data and service data to the DHCT 16. The on-demand DTCs 240 can carry information intended for a particular subscriber, such as compressed video and audio pertaining to subscriber requested a bi-directional communication service, as well as other specialized data information. Each carousel and on demand DTC 240 is defined by a session managed by the session manager 334 (shown in FIG. 3) via the MPEG-2's Digital Storage Media—Command and Control (DSM-CC) protocol.

FIG. 3 is a block diagram of portions of a headend 11 that is configured to provide session-based services such as bi-directional communication services and a BSPG comprising electronic information about each respective service in accordance with one embodiment of the present invention. These services include, among other things, session-based bi-directional communication services that are purchasable by a subscriber on an individualized basis for a period of time. A purchasable bi-directional communication service may comprise a vendor that communicates remotely with the purchaser over the period of time for which the service is purchased. Particular vendors may offer the flexibility to purchase their respective services for any of a plurality of time durations, reflecting higher pricing for longer periods. Other purchasable bi-directional communication services, such as a person-to-person bi-directional audiovisual phone session, may not involve a vendor at the remote location.

A bi-directional communication service may comprise real-time communication concurrently between a vendor and a plurality of subscribers. With reference to the block diagrams of FIG. 3 (headend 11) and FIG. 4 (DHCT 16), a headend 11 is configured to provide purchasable bi-directional communication services, either as an on-demand or a scheduled reservation service with a plurality of possible delivery durations. In the system headend 11, the BSPG application server 319 and a plurality of other application servers (not shown) are connected to a digital network control system (DNCS) 323 via an Ethernet connection 332. The BSPG application server 319 is responsible for reserving and configuring system resources needed to provide bi-directional communication services, for packaging, configuring and making available to the system the executable software program comprising the BSPG client application 477 (FIG. 4), and for providing BSPG data 478 corresponding to the available bi-directional communication services to the BSPG client application 477 (FIG. 4). A BSPG client application 477 executing on processor 444 in DHCT 16 generates a user interface that is displayed on television 441 for the subscriber to browse, purchase, and establish individualized bi-directional communication with any from a plurality of bi-directional communication services. This may require, among other things, engaging, preferably, in a direct two-way IP (Internet Protocol) connection with bi-directional communication (BC) servers 322 for a finite period.

As necessary, BSPG application server 319 configures BC server 322 for bi-directional communication with a component in head end 11 providing external communication. BC server 322 establishes bi-directional communication with a respective service provider (or equivalently, a remote personal destination) via one or more external communication interfaces in headend 11 connected to BC server 322 via an Ethernet connection 332 for bi-directional information and media transmission. In the event that a respective service provider is within the subscriber network television system spanned by headend 11, BC server 322 is configured by BSPG application server 319 for personalized bi-directional communication between a respective service provider (or remote personal destination) in a direct two-way IP connection with BC server 322 serving as a bi-directional gateway.

External communication interfaces include router 372, satellite receiver 374, a satellite transceiver 276, a terrestrial receiver or antenna 378 and a bi-directional gateway 380 connected to backbone switch 382 that in turn is connected to components in head end 11 via Ethernet connection 332. The bi-directional gateway 380 can be connected to an internet service provider (not shown) and router 372 can be connected to a long-distance data network (not shown).

As will be readily apparent to one of ordinary skill in the art, additional external communication interfaces may exist at the head end 11 and any external communication interface components may be connected to backbone switch 382 or may be connected directly to the Ethernet connection 332. For instance, a router 372 and gateway 380 may possess Ethernet communication ports and may be directly connected to components in the headend 11 via the Ethernet connection 332.

The DNCS 323 provides complete management, monitoring, and control of the network's elements and broadcast services provided to users. The DNCS 323 provides control and communication functionality by monitoring the DHCTs 16 and facilitating messaging between the DHCTs 16 and components within the headend 11. When any of the communication functionality is provided by headend 11 components other than the DNCS 323, the DNCS 323 indirectly provides similar functionality by providing the control and coordination to those other devices that provide the required communication functionality to enact a particular media service.

In one implementation, the DNCS 323 includes functional support for client-server applications and other components in the DBDS with its server counterparts, including BFS Server 328 and a service application manager (SAM) server 325. Briefly, the client-server application counterparts work in coordination with DNCS 323 to effectively utilize the primary features of the interactive television system and manage the sale of an individualized purchased session for a bi-directional communication service. Furthermore, the client-server application software in communication with DNCS 323 can effectively allocate bi-directional bandwidth capacity to render a session-based bi-directional communication service and manage impulse or scheduled purchase, in cooperation with the BSPG client application 477 (FIG. 4).

The DNCS 323 includes a session manager 334 and a conditional access system 370. The session manager 334 preferably uses the MPEG-2 DSM-CC protocol to coordinate requests for bi-directional communication services from a subscriber using DHCT 16, as a non-limiting example, for a purchasable individualized service from a vendor that provides a bi-directional communication service. The session manager 334 processes user to network (U-N) session and respective signaling messages, manages allocation of session-related network resources and supports network management operations. The session manager 334 supports exclusive services, such as the BSPG service, by providing the signaling interface to establish, maintain, and release client initiated exclusive sessions. The session manager 334 acts as a point of contact to the network for the DHCT's 16 in the communications network 18 to establish individual sessions. The session manager 334 also defines a resource descriptor structure, which is used to request the network resources within a session.

The conditional access (CA) system 370 communicates with the DHCT 16 and the billing system 320 to determine whether a particular subscriber is authorized to receive a BC service. If a DHCT 16 is not authorized for BC service, the conditional access system 370 insures that such services are not transmitted. The DNCS 323 uses a data insertion multiplexer 329 and a data QAM 330 to insert the in-band broadcast file system (BFS) data into a compressed data stream, for a non-limiting example, an MPEG-2 transport stream.

The BSPG application server 319 communicates via the Ethernet connection 332 to a SAM server 325 contained on the DNCS 323. The SAM server 325 is a server component of a client-server pair of components, with the client component being located at the DHCT 16. Together, the client-server SAM components provide a system in which the user can access services, which are identified by an application to run and one or more parameters, such as particular data, specific to that service. The SAM server 325 also manages the life cycle of the applications on the system, including the definition, activation, and suspension of services they provide and the downloading of the applications into the DHCT 16 as necessary. The BSPG application server 319 defines its application to the SAM server 325 and the SAM server 325 instructs the BFS server 328 to add the BSPG client application's 477 (FIG. 4) executable code to a carousel (not shown) for distribution to the various DHCTs 16 in the network 18.

The BFS server 328 is a part of a broadcast file system that has a BFS client 443 (FIG. 4) in each DHCT 16 in the communications network 18. Applications on both the headend 11 and the DHCT 16 can access the data stored in the BFS server 328 in a similar manner to a file system found on disc operating systems. The BFS server 328 loads data for applications on a carousel (not shown) that sends data in a cyclical repeated fashion, each cycle approximately the same period of time so that the DHCT 16 that communicates a request for any particular data may receive it when the user desires the data. Thus, the BFS client 443 (FIG. 4) contained in the DHCT 16 that receives the broadcast from the BFS server 328 can implement the application for the user.

BSPG data resides in the BSPG application server 319 as composed for BC services available for the current time and future periods. BC server 322 contains a storage and memory cache that serves as a temporary repository for buffering upstream information, data or media generated by a subscriber during a session of a bi-directional communication service. Likewise, the storage and memory cache in BC server 322 serves as a temporary repository for simultaneously buffering downstream information, data or media generated by a service provider, vendor or remote personal location during a session of an individualized bi-directional communication service.

The BC servers 322 deliver MPEG-2 content to a group of QAM modulators 324. Media or data from the remote location may comprise live video, audio, graphics, and/or text and be transmitted respectively as an MPEG-2 video and audio program to the subscriber. Graphics, textual or other information may be transmitted as an MPEG-2 private data program. Media or data from the remote location may be pre-recorded rather than a live individualized transmission. The BSPG application server 319 is responsible for managing the configuration of BC servers 322 and the external communication interfaces. The BC servers 322 are employed to deliver the data, video and/or audio streams that make up the BC services.

The QAM group 324 is actually a multiplex of QAMs that support media transmission to a particular DHCT 16. The session manager 334 in DNCS 323 determines which QAM modulator has access to a particular DHCT 16. The QAM modulators 324 are also responsible for encrypting the transport stream and inserting other data and information into the stream. The QAM modulators 324 receive the MPEG-2 transport stream from the BC servers 322 and convert it to an encrypted RF signal at a specified frequency (channel).

The quadrature phase shift keying (QPSK) modem 326 is responsible for transporting the out-of-band IP (Internet protocol) datagram traffic between the distribution headend 11 and a DHCT 16. Data from the QPSK modem 326 is routed by headend router 327 within the headend 11. The headend router 327 is also responsible for delivering upstream application traffic, such as a user's requests for a BC service, to the various application servers.

With reference to the block diagram of FIG. 4, the DHCT 16 is typically situated within the residence or business of a subscriber. It may be integrated into a device that has a display 441, such as a television set, or it may be a stand-alone unit that couples to an external display 441, such as a display included with a computer or a television, and that processes media transported in television signals for presentation or playback to a subscriber (user of the DHCT 16). The DHCT 16 preferably comprises a communications interface 442 for receiving the RF signals, which can include media such as video, audio, graphical and data information, from the tap 14 and for providing any reverse information (such as BSPG data as required by a subscriber that has purchased as BSPG service) to the tap 14 for transmission back to the headend 11 (FIG. 1). The DHCT 16 further includes a processor 444 for controlling operations of the DHCT 16, including a video output port such as an RF output system 448 for driving the display 441, a tuner system 445 for tuning into a particular television channel to be displayed and for sending and receiving data corresponding to various types of media from the headend 11.

The tuner system 445 includes in one implementation, an out-of-band tuner (OOB) for bi-directional quadrature phase shift keying (QPSK) data communication and a quadrature amplitude modulation (QAM) tuner for receiving television signals. The OOB coupled with an upstream transmitter enable the DHCT 16 to interface with the network so that the DHCT 16 can provide upstream data to the network, for example via the QPSK or QAM channels. This allows a subscriber to interact with the network to request BSPG services and, if necessary, encryption can be added to the OOB channels to provide privacy.

Additionally, DHCT 16 includes a receiver 446 for receiving externally generated information, such as user inputs or commands for other devices. The DHCT 16 may also include one or more wireless or wired communication interfaces, also called ports, for receiving and/or transmitting data to other devices. For instance, the DHCT 16 may feature USB (Universal Serial Bus) (for connection to a USB camera or microphone), Ethernet (for connection to a computer), IEEE-1394 (for connection to media devices in an entertainment center), serial, and/or parallel ports. A computer or transmitter may for example, provide the user inputs with buttons or keys located either on the exterior of the terminal or by a hand-held remote control device 480 or keyboard that includes user-actuated buttons. In the case of bi-directional services, a user input device may include audiovisual information such as a camera, microphone, or videophone. As a non-limiting example, the DHCT 16 may feature USB or IEEE-1394 for connection of an infrared wireless remote control 480 or a wired or wireless keyboard, a camcorder with an integrated microphone or to a video camera and a separate microphone.

Technology for digitizing and compressing/decompressing video and speech signals is well-known in the art. In a preferred embodiment, the DHCT 16 of the present invention has the capability to simultaneously decompress and reconstruct video, audio, graphics and textual data that may, for example, correspond to a live BSPG service. This permits the DHCT 16 to store video and audio in memory in real-time, to scale down the spatial resolution of the video pictures, as necessary, and to composite and display a graphical user interface (GUI) presentation of the video with respective graphical and textual data while simultaneously playing the audio that corresponds to the video. The same process applies in reverse and DHCT 16 can, for example, digitize and compress pictures from a camera for upstream transmission.

In one implementation, a memory portion 449 of the DHCT 16 includes flash memory 451 and dynamic random access memory (DRAM) 452 for storing the executable programs and related data components of various applications and modules for execution by the DHCT 16. Both the flash memory 451 and the DRAM memory 452 are coupled to the processor 444 for storing configuration data and operational parameters, such as commands that are recognized by the processor 444.

Basic functionality of the DHCT 16 is provided by an operating system 453 that is contained in flash memory 451. One or more programmed software applications, herein referred to as applications, are executed by utilizing the computing resources in the DHCT 16. The application executable program stored in flash memory 451 or DRAM memory 452 is executed by processor 444 (e.g., a central processing unit or digital signal processor) under the auspices of the operating system 453. Data required as input by the application program is stored in DRAM memory 452 and read by the processor 444 from DRAM memory 442 as needed during the course of application program execution. Input data may be data stored in DRAM memory 452 by a secondary application or other source, either internal or external to the DHCT 16, or possibly anticipated by the application and thus created with the application program at the time it was generated as a software application program, in which case it is stored in flash memory 451. Data may be received via any of the communication ports of the DHCT 16, from the headend 11 via the DHCT's network interface (i.e., the QAM or out-of-band tuners) or as user input via receiver 446. A type of input data fulfills and serves the purpose of parameters as described below. Data generated by application program is stored in DRAM memory 452 by the processor 444 during the course of application program execution.

The flash memory 451 also contains a platform library 456. The platform library 456 is a collection of functionality useful to applications, such as a timer manager, compression manager (for compressing text, video and/or audio), database manager, string managers, and other utilities (not shown). These utilities are accessed by applications as necessary so that each application does not have to contain these utilities thus resulting in memory consumption savings and a consistent user interface.

The client component SAM 457 (hereinafter the SAM client 457) of the client-server pair of components provides a model in which the user can access services available on the system. A service consists of an application to run and a parameter, such as data content, specific to that service. The SAM client 457 handles the lifecycle of the applications on the system, including the definition, initiation, activation, suspension and deletion of services they provide and the downloading of the application into the DHCT 16 as necessary. Many services can be defined using the same application component, with different parameters. The SAM client 457 is a part of the platform 456. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID. The Client SAM 457 also interfaces with the resource manager 467 to control resources of the DHCT 16.

An application client is the portion of an application that executes on the DHCT 16 and provides the application's services to the user typically through a graphical user interface. Also contained in flash memory 451 is a navigator application 455 which provides a navigation framework for the user to access services available on the cable system. Examples of the services include, in one implementation, watching television and pay-per-view events, listening to digital music, and an interactive bi-directional service program guide, each of which is controlled through separate applications in flash memory 451. The navigator 455 also allows users to access various settings of the DHCT 16, including volume, parental control and VCR commands. Moreover, the navigator 455 provides users with television related menu options that correspond to DHCT 16 functions such as interactive program guides, channel blocking and/or displaying a BSPG purchase list.

The traditional interactive program guide (IPG), Watch TV 462, and pay-per-view (PPV) are examples of resident applications in flash memory 451. The IPG displays a program guide to the user and populates the guide with program data for selection. Watch TV 462 enables a user to simply "watch television" while PPV enables viewing of premium television services. These applications, because they are in flash memory 451, are available to the user and do not need to be downloaded each time the DHCT 16 initializes.

The applications that are stored in the DRAM 452 may be applications that are loaded when the DHCT 16 initializes or are applications that are downloaded to the DHCT 16 upon a user-initiated command using an input device such as the remote 480. In a non-limiting example, DRAM memory 452 may contain the following application clients (hereinafter referred to as "application(s)"): a video-on-demand application (VOD) 463, an e-mail application 465 and a digital music application. Additionally, DRAM memory 452 could also contain a calendar and/or a calculator application. It will be obvious to one with ordinary skill in the art that these applications are illustrative and merely serve as examples of possible embodiments of the invention.

The applications discussed above and other applications provided by a cable system operator are top level software entities on the network for providing services to the user. In one implementation, all applications executing on the DHCT 16 work with the navigator 455 by abiding by several guidelines. For example, an application should first utilize and implement the SAM client 457 for provisioning, activation, and suspension of services. Second, an application should share DHCT 16 resources with other applications and abide by the resource management policies of the SAM client 457, the operating system 453, and the DHCT 16. Third, an application should handle all situations where resources are unavailable without navigator 455 intervention. Fourth, when an application loses service authorization while providing a service, an application should suspend the service gracefully. The navigator 455 will reactivate an individual service application when it later becomes authorized. Finally, an application should be configured so it does not respond to input commands reserved for the navigator. For instance, as a non-limiting example, when user input commands are entered via a wireless remote control device 480 or keyboard, the application should be configured so it does not have access to certain user input keys that are reserved by the navigator 455 (i.e., power, channel +/−, volume +/−, etc.). Without limitation to the foregoing, in some circumstances certain applications during the course of program execution may reach a machine-state in which input keys that would ordinarily be reserved may be employed for input by the application but only during that particular machine-state. For instance, an application may display a user interface that specifically requests input or selection from the user in which one or more of the reserved keys are used momentarily during that machine-state.

Other forms of input are subject to similar configuration so that DHCT 16 does not respond to input commands reserved for the navigator 455. For example, a video or speech signal in a DHCT 16 that is input from a wired or wireless microphone and has been digitized and compressed in the DHCT 16 as part of a BSPG service session would be subject to this configuration.

In an alternate embodiment, an audio input port (not shown as a separate input) in the DHCT 16 comprises a single receiver device. In such an embodiment, the DHCT 16 has digital signal processing capability that implements a subtraction filter to effect subtraction of the audio generated by the DHCT 16 from the speech signal received from the user (and for echo cancellation).

Another application shown in FIG. 4 that is contained in DRAM memory 452 is the bi-directional services program guide client application 477 (hereinafter referred to as "BSPG client application 477"). BSPG client application 477 preferably is downloaded into DRAM 452 from the head end 11. Alternatively, the BSPG client application 477 may be resident in flash memory 451. Similar to an EPG application that has an EPG database of records in which program information is supported by client-server EPG counterparts, the BSPG client application 477 employs a BSPG database 478 of records that comprises of information pertaining to bi-directional communication services for presentation to a subscriber.

A bi-directional communication service is rendered as a session-based service effected by the head end 11 components as described above. Among other things, session-based bi-directional communication services include services that are purchasable by a subscriber on an individualized basis for a period of time. A purchasable bi-directional communication service may comprise a vendor that communicates remotely with the purchaser over the period of time for which the service is purchased. Particular vendors may offer the flexibility to purchase their respective services for any from a plurality of time durations, reflecting higher pricing for longer periods. Other purchasable bi-directional communication services, such as a person-to-person bi-directional audiovisual phone session, may not involve a vendor at the remote location.

A session for a bi-directional communication service may comprise communication concurrently between a vendor and a plurality of subscribers and a session for a bi-directional communication service may comprise real-time communication between a subscriber and a vendor or friend. Alternatively, a subscriber can purchase a bi-directional communication service for a future period resulting in a purchased reservation for the respective service. Hence, a bi-directional communication service may be fulfilled as a scheduled session per an advanced purchase by a subscriber.

The BSPG database 478 contains sufficient information for the presentation of available bi-directional communication services at the current time and for subsequent periods. The BSPG application server 319 in communication with BSPG client application 477 effects updates to the BSPG database 478 stored in memory 449 or in a storage device connected internally or externally to DHCT 16 via a data communication port such as a USB (Universal Serial Bus) or IEEE-1394.

The BSPG client application 477 consists of a GUI that may be customized remotely by the system operator and updated as program data is received by the DHCT 16 via its cable communication interface. The BPSG client application 477 receives input commands generated by a user via an input device such as a remote control device 480 or via the input communication port 474 in DHCT 16.

BSPG client application 477 reads records in BSPG database 478 and processes them into a displayable representation as part of a GUI presentation displayed on a television 441 or similar display device for presentation to a subscriber.

BSPG information associated with a bi-directional communication services is transmitted on a regular or periodic basis from the BSPG application server 319 (FIG. 3) to one or more DHCTs 16. BSPG information may comprise descriptive information to populate the entries of a BSPG presentation, a service guide, or an EPG presentation with the corresponding BSPG fields that are presented to the subscriber via a Graphical-User-Interface (GUI) from which a subscriber can select and request additional descriptive information about respective bi-directional communication services. Hence, per BC service information in the displayed presentation to the subscriber, the subscriber can retrieve and view (and hear if applicable) information specific to a BC service and proceed to select and purchase a specific BC service for a price over a period of time. BSPG information comprises data organized into database records with fields containing, but not limited to, information such as a service title, service content description, service category, name of vendor providing service, one or more names of individuals representing vendor that are available to fulfill the service, and service's rating information. The BSPG database 478 comprises additional data, including a plurality of purchasable durations with price for each respective service; an indication of whether a service can be optionally recorded by the purchaser for an additional price; one or more time intervals for which a service is available during the day; days of the week for which a service can be purchased; and a calendar window comprising a start date and an end date for which a service is offered. A service may be offered indefinitely.

Options for purchasing a package for multiple sessions of a service can be included in the BSPG database. BSPG database records may also include information such as service active times, service titles, service descriptions, service genres, casts lists, ratings information, price criteria (or combinations of multiple price criteria) associated with various viewing options, service durations, and/or links to additional respective program related information such as service previews. The effective window of days and times in which a service is available for purchase may also be included. Further, geographical information related to purchasable services may be included in the database records, such as time zone, geographical location and language(s) of merchant. Other illustrative information that may be present includes type of service (e.g. audio or video or both) and video quality/resolution.

The BSPG database 478 includes additional information associated with each respective service's availability at the current time. Preferably, the BSPG database 478 includes a separate "availability table" of entries, each entry respectively associated with a respective service, each service having an index number for which the table can be rapidly be indexed with a service's number, and each entry respectively indicating whether a service is available at a selected time. Whereas the BSPG information associated with a bi-directional communication services is transmitted on a regular or periodic basis from the BSPG application server 319 (FIG. 3) to one or more DHCTs 16, the "availability table" or one or more subsets thereof, is transmitted asynchronously and on a more frequent basis as need be to update the availability status of services at the current time.

The BSPG information and availability table are transmitted in a preferred embodiment from the BSPG server 319 to one or more DHCTs 16 via the BFS server 328. The BPSG receives updates to the BSPG database 478 and/or the availability table via the BFS client 443. Updates may be effected immediately or, in an alternate embodiment, at periodic intervals.

A type of purchasable bi-directional service offered by a vendor comprises a finite number of instantiations according to the resources and/or number of individuals that the vendor has to render the service from the remote location. For example, a personalized auto diagnostic service may feature four different mechanics with four respective sets of audio-visual equipment and communication interfaces to render its service. On the other hand, certain services may have resources for only one instantiation of the service.

Upon a session set-up for an available purchased service to a first purchaser, the BSPG server 319 momentarily withholds grants to a second purchaser for the same service and immediately determines if the session constitutes the last available instantiation for that service. If a service's available instantiations are exhausted, the BFS server 319 denies service to the second purchaser and alternatively the BSPG client 477 queries the purchaser to schedule a future time or to purchase another service. Simultaneously upon determining that a session constitutes the last instantiation of a service, the BSPG server 319 updates the availability table information to indicate that the respective service is not currently available and the updated availability table or a subset thereof is loaded into the BFS server 328 where it is immediately broadcast through the communications network 18. The version of the corresponding BFS file is automatically updated by the BFS server 328 and causes DHCT 16 to be signaled for reception for an updated file.

FIG. 5 is another depiction of selected elements of the DHCT 16 including some of the elements previously discussed. This figure shows a tuner system 445 that can select one of a plurality of transmission channels provided by a communications network 18 of a subscriber television system such as, for a non-limiting example, a digital cable TV network or a DBDS. The tuner system 445 enables the DHCT 16 to tune to upstream media and data transmissions, thereby allowing a user to receive digital video, audio and data content associated with a program or a bi-directional communication service content transmitted via the subscriber network television system. Also included within the DHCT 16 are an out of band (OOB) tuner and upstream transmitter 547 connected to the communications interface 442. It should be appreciated that although the OOB tuner and upstream transmitter 547 are illustrated as one component in FIG. 5, the tuner and transmitter can be independent of each other and located separately within the DHCT 16. Nonetheless, both components are in communication with the subscriber network television system so that upstream transmissions can be received by the system during a bi-directional communication service. The OOB tuner and upstream transmitter 547 enable the DHCT 16 to interface with a subscriber network television system so that the DHCT 16 can provide upstream data to the network, for example, via a QPSK channel that serves as an upstream OOB channel (see FIG. 2) and received by a QPSK receiver in QPSK modem 326 in headend 11. In this manner, a subscriber can interact with the subscriber network television system to request services or a service's data such as, for a non-limiting example, BC services and BSPG data, respectively.

Alternatively, upstream data transmission can be effected via a QAM channel with a QAM transmitter in DHCT 16 and a QAM receiver in headend 11.

Alternatively, a telephone modem (not shown) in the DHCT 16 can be utilized for upstream data transmission and a headend 11 or hub 12 or other component located upstream in the subscriber network television system may receive data from a telephone network coupled to a telephone modem and can route the upstream data to a destination internal or external to the subscriber network television system.

The DHCT 16 includes a demultiplexing system 543 comprising functionality for QAM demodulation, forward error correction (FEC), transport demultiplexing, decryption, and parsing, as is well known in the art, to counter the effect of signal processing of broadcast media and data in the subscriber network television system. Transport demultiplexing preferably includes MPEG-2 transport demultiplexing. The demultiplexing system 543 in communication with communication interface 442, tuner system 445 and processor 444 effects reception of compressed video streams, compressed audio streams, and compressed data streams corresponding to a selected or requested BC service to be separated from other programs and/or streams transported in the tuned transmission channel and to be eventually presented to the subscriber in accordance with the preferred embodiment of the present invention. The DHCT 16 also includes a media engine 580 configured with elements for driving the television display 441, in cooperation with output system 448, wherein the media engine 580 also includes decoding circuitry 598 to decode compressed digital video and digital audio and data. Data packets from media and/or data streams corresponding to a session of a BC service that are stored in media memory 560 are decompressed by decoding circuitry and reconstructed for presentation and playback. Further elements include media memory 560, which is used to store compressed media and data packets and the respective reconstructed version corresponding to a program being viewed or to a purchased BC service. The reconstructed representation of the media streams as well as graphical information that comprise a graphical user-interface are displayed for presentation to the viewer.

Data packets from media and/or data streams corresponding to a session of a BC service that are stored in media memory 560 are decompressed by decoding circuitry and reconstructed for presentation and playback.

The security processor 565 is a secure element for performing security and conditional access related functions. More particularly, the security processor 565 functions to authorize a paying subscriber's DHCT 16 to execute specialized functionality of the DHCT 16, such as receiving and decrypting (or descrambling) encrypted (or scrambled) media and other data sent from a remote device. Security processor 565 preferably includes a microprocessor, and a memory that only the microprocessor of the security processor 565 may access. Preferably, security processor 565 is contained in a tamper proof package. With reference to FIG. 3, in one implementation, media streams from the remote destination comprising a BC session, are received via an external communication interface in the head end 11 or from within headend 11 (as described above) and sent to the BC server 322. Communication with the BC server 322 may comprise a secured IP connection in which a resident encryption mechanism is negotiated and exercised by the remote destination and the BC server 322. Alternatively, encryption may not be applied between the remote destination and the BC server 322.

Encryption is applied to the data stream of the requested media, for a non-limiting example the respective media streams from the remote destination comprising a BC session, and at the QAM group 324 at the headend 11 according to encryption methods well-known to those skilled in the art. An encryption component resident in the QAM group 324 in the head end 11 and under the direction of the DNCS 323 encrypts, for a non-limiting example, MPEG-2 transport stream packets used to transmit the BC session's streams. The encrypted streams also include, in one embodiment, entitlement control messages that are recognized by the security processor 565 (FIG. 5) at the DHCT 16 as information is needed to decrypt the encrypted BC session's streams. The security processor 565 preferably stores authorization information, wherein the authorization information indicates that the subscriber is entitled to access the BC session's streams. The authorization information is obtained from one or more entitlement messages sent by the head end 11 after, or concurrently with, initialization of the DHCT 16 into a purchased BC service. If the authorization information indicates that the subscriber is entitled to the BC session's streams, the security processor 565 generates a code word or key based on the authorization information and the received entitlement control message, and the security processor 565 uses this key to decrypt the encrypted BC session's streams at the decryptor 588 (FIG. 5).

The DHCT 16 includes an internal clock 582 and timers 590 that enable computation of the time relationship between its internal clock and the clock specified by the received BC session's streams. Hence, by reading and interpreting the clock and time stamps specifications intrinsic in the BC session's streams (for example, as provisioned in MPEG-2), or as communicated by the head end 11 via the out of band pathway or channel, the DHCT 16 can effect an output for the media and/or information received from the remote location as a synchronized presentation to the user that includes reconstructed video pictures, the reconstructed digital audio samples, and supplementary information that emanated from the remote location.

Under the auspices of the real-time operating system 453 (FIG. 4) executed by processor 444, and in coordination with BSPG client application 477, received packets corresponding to the BC session's media streams and/or data are received in DHCT 16 via communications interface 442 and stored in a temporary buffer in memory 449. The temporary buffer is implemented and managed as a circular buffer to enable data transfers from the temporary buffer to the media memory 560 in concert with the insertion of newly arriving packets into the temporary buffer. Packets are read from the temporary buffer in memory 449 and written to media memory 560 in a sufficiently fast manner. Orchestration of multiple simultaneous data transfer operations is effected so that while packets are being transferred from memory 449 to media memory 560, new packets are received and stored in the temporary buffer.

Therefore, the BSPG client application 477 provides the user with a presentation of available bi-directional services to choose from and can check the availability of and purchase the requested service for a duration of time. The BSPG client application 477 provides bi-directional services to the user by engaging, preferably, in a direct two-way IP connection with BC servers 322.

The BSPG client application 477 configures the DHCT 16 for the reception and transmission, purchase, and billing of a purchased BC service for a period of time. The BSPG client application 477 also provides for a user interface for the specification of options for purchasing a BC service from a plurality of time durations, reflecting higher pricing for longer periods, in cooperation with the BSPG application server 319 (FIG. 3) and in cooperation with other head end 11 components, including the pricing system 321. Regarding the billing functionality, after a purchase transaction has occurred and the purchase is acknowledged, the purchase is recorded for billing purposes. In one embodiment, the BSPG client application 477 configures the processor 444 to cause BSPG purchase transactions to be stored in the FLASH memory 451 part of system memory 449 or in some other designated nonvolatile memory section of DHCT 16 as purchase transactions occur. BSPG transaction records and associated fees are transmitted upstream via the OOB upstream channel at designated scheduled times (e.g., during low bandwidth consumption periods) to the billing system 320. Alternatively, the BSPG application server 319, under the direction of the billing system 320, may periodically poll individual DHCTs 16 or group of DHCTs to collect their respective BSPG transaction history. BSPG transaction records received from subscriber's DHCT 16 by the BSPG application server 319 are debited from subscriber's respective account by the billing system 320.

BSPG data associated with BC services is transmitted on a regular or periodic basis from the BSPG application server 319 to one or more DHCT 16. BSPG information may comprise descriptive information to populate the entries of a service guide or the corresponding BSPG fields of an EPG that is presented to the subscriber via a GUI from which a subscriber can select and request additional descriptive information about respective BSPG services. Hence, per BSPG title information in the displayed presentation to the subscriber, the subscriber can retrieve and view information specific to a BC service and proceed to purchase specific a BC service for a specified period.

The BSPG client application 477 can offer the user a plurality of choices, wherein the user may select from pre-configured options from an input device such as a wired or wireless keyboard or remote control 480 to purchase a BC service for one of various durations and from options to purchase the service at the current time impulsively or at any of various future periods of time.

The BSPG client application 477 also preferably tracks periods and consumption for active services and determines whether the service access time is about to expire. Hence, the BSPG client application 477 performs a "remaining time" comparison for each user-effected service purchased. When the BSPG client application 477 determines that the remaining service access time approaches the cross point in time for which the service is to expire, it alerts the user to the situation via a warning barker or banner that is displayed via the television 441. Alternatively a user can be alerted via a blinking light on the DHCT 16 and/or via a sound signal.

When a user selects a bi-directional service, the BSPG client application 477 confirms availability of the service and waits for a start of service notification from the BSPG application server 319. As stated above, when required, the BSPG application server 319 updates the availability table when all available instantiations for a service are consumed. Updates may be effected immediately or, in an alternate embodiment, at short periodic intervals. Thus, when a user selects a bi-directional service, the BSPG will be updated to reflect that use.

Upon a user instantiating a purchase of a bi-directional service for a price via the displayed graphical interface (i.e., the subscriber enters input via an input device and such input may comprise a password or PIN to authenticate authorization to purchase service), a purchase transaction is executed by the processor 444 or some other processor in DHCT 16 that causes a session to be set-up between subscriber network television system resources to the DHCT 16. A logical connection between the DHCT 16 and a remote location for the BC service is established. The remote location may involve bi-directional exchange of audio-visual or other information via a router 372, bi-directional gateway 380 or BC server 322. As facilitated by the session manager 334 in the DNCS 323, a session is a logical entity used to define a connection between the DHCT 16 and the BC server 322 and the resources used to maintain that connection in the subscriber network television system. The session manager 334 coordinates and effects the signaling required to implement the session which is preferably defined by the MPEG-2 standard's ISO/IEC 13818-6 IS (MPEG-2 DSM-CC). Upon a session setup request generated by the DHCT 16 (usually in response to a request from a subscriber), the DNCS 323 verifies the eligibility of the DHCT 16 to receive the bi-directional service being requested and then passes the request to the BSPG server 319.

If the BSPG server 319 determines that it can deliver the service, it communicates with the DNCS 323 to reserve the network resources required for the requested service. The DNCS 323 in communication with BC servers 322 allocates the requested resources, including the necessary bandwidth, and sends a message back to the BSPG server 319 to indicate that the requested resources have been allocated. This message contains MPEG-2 transport stream ID, identifying the physical connection from a router 372 or bi-directional gateway 380 to the BC server 322, and the connectivity from the BC server 322 to the QAM 324 to the Hub 12 in which the DHCT 16 is connected. The amount of bi-directional bandwidth that will be reserved for the duration of the bi-directional services session is also communicated to the relevant servers and headend 11 components. Bandwidth allocation entails an assignment of system resources for a time interval for delivering a bi-directional service. The time interval is characterized by a specific start time and duration.

Via the messaging capabilities of the DNCS 323, the BSPG server 319 next sends a message to the DHCT 16 that indicates that it is ready to begin delivering the bi-directional service video and audio content using the resources allocated. The DHCT 16 receives information in the message identifying the QAM Modulator that is transmitting the video content (and hence where to tune to receive the requested content) and the bandwidth allocated to deliver the service. After a session has been established, the DHCT 16 communicates directly with the BC server 322 to facilitate delivery of the requested service. Throughout the course of time that a bi-directional service is active further messaging is conducted between the respective DHCT 16 receiving the BSPG service and the BSPG server 319 and/or the BC server 322 via the DNCS 323 to monitor the status of the session. Thus, the BSPG server 319 can monitor that a session is properly functioning.

As aforementioned, a user may select a bi-directional service by navigating through a displayed BSPG GUI presentation by manipulating designated buttons of a wired or wireless remote device 480. The selection of a bi-directional service or entry from the BSPG client application 477 invokes a query as to the availability of the selected service. The query is translated into one or more application executable calls that are executed by the navigator 455 and the SAM client 457 to activate the requested service. Any of a multiplicity of bi-directional services may be activated through the BSPG client application 477 and its corresponding interface (discussed below).

References to the selection of a service or entry from the multiplicity of services and/or entries displayed by the BSPG client application 477 on the display 441 comprise the process of interactively navigating by moving the highlight cursor and transmitting input commands to the DHCT 16. The processor 444 processes data extracted and/or interpreted from the input commands to effect visual cursor position and visual feedback of the user's selection on the display 441. When the user inputs a selection, the processor 444 invokes communication between internal components in the DHCT 16, including software components such as the navigator 455 and SAM client 457, to activate the selected service. The processor 444 employs the messaging services of the operating system 453 to effect the communication between any two or more of the internal components.

FIG. 6 is a diagram of the display 441 with a BSPG presentation 670 presented to the user by the DHCT 16. The BSPG presentation 670 is displayed upon activation of the BSPG GUI. At activation, a navigable menu 672 is presented to the user. In one embodiment, the BSPG presentation 670 includes a series of navigable and selectable bi-directional services 676 that link the subscriber to a selected service.

A system operator at the headend 11 uses the BSPG server 319 (FIG. 3) to a priori configure the BC services and respective BSPG database 478 for display in the BSPG presentation 670 depicted in FIG. 6.

A BSPG server 319 generates a version of the BSPG database 478 that identifies the particular services offered, so that when the subscriber selects one of the service links 676 the BSPG 70 knows which service to activate. BSPG program information is coalesced and stored in the BSPG server 319 at the headend 11 for transmission to DHCTs 16 throughout the communications network 18 as the BSPG database 478, or only to those DHCTs authorized to receive BSPG data. The BSPG server 319 formats the BSPG database 478 into a format interpretable by the BSPG client application 477 running in the DHCT 16 and feeds the data via the BFS from the headend 11 for downstream transmission to the DHCTs 16.

A record of the BSPG database 478 that corresponds to a selected bi-directional service may, for example, include a short description of the service and a reference the target service and application that provides the service. Similarly, the SAM service ID or the actual channel assigned to a desired service may also be used to activate a service. Examples of bi-directional services that can be included in the BSPG presentation 670 include, but are not limited to, those provided by the following applications: personalized expert advice, personalized adult entertainment, personalized education, or personalized medical assistance. In a preferred embodiment, any bi-directional service available to the user in the cable system 10 can be accessed via the BSPG presentation 670, as configured by the system operator and/or in the respective alternate embodiments as configured by the user to reflect a user's own customization and preferences.

In a preferred embodiment, BSPG database information for each bi-directional service is displayed in the BSPG presentation 670 in a grid format (see FIG. 6) to enable scrolling through the plurality of services by time and service. As a non-limiting example, an information key on a remote device 480 may be configured to instruct the BSPG client application 477 to display the information corresponding to a selectable bi-directional service. As another non-limiting example, the BSPG presentation 670 may immediately present additional information about a selectable bi-directional service after the user moves the cursor 678 onto the selectable area of the BSPG presentation 670.

Bi-directional service authorization information is available to the BSPG 670 via the SAM. A user may select a bi-directional service link 676 displayed in the BSPG presentation 670 and the request for the process of granting the bi-directional service will proceed only if the user is authorized. If the user is not authorized, visual or audio feedback such as a "grayed out" area should be displayed to indicate that the user may not select the link label 676 for activation of that service. Alternatively, unauthorized services may not be displayed at all. Alternatively, unauthorized services are coalesced into a service category such as "Other Purchasable Services" or "Other Available Services."

Either the system operator of the cable television system or the user of the DHCT 16 may configure the display status of the respective bi-directional service link 676 with respect to authorization status and availability of the target service. Alternatively, the BSPG server 319 automatically generates availability and status information for each respective bi-directional service via transmission of updated availability table as previously described. The user, through a settings menu (not shown) may configure the BSPG presentation 670 so that the display mode of one or more selectable bi-directional services links 676 is "inactive" or "none" so the display of the selectable bi-directional service conforms to the display modes described above.

FIG. 7 is an example of a main session purchase screen 700 illustrating the main screen following the selection of a first BC service by the subscriber in a BSPG presentation 670. The main purchase screen displays features provided by the BSPG application 477 (FIG. 4). The example main session purchase screen 700 includes a title header 701 suggesting to the user the purpose of the screen, and a subtitle header 702 indicating which hierarchical level of the session purchase screen displays is currently displayed, in this instance, a main screen 700. Example main screen 700 includes an information window 710 that provides brief descriptive information, such as, for a non-limiting example, service title, rating, availability, service description, duration, and price. More or less information may be included according to the information available in the BSPG database 478.

Example session main screen 700 also includes several pre-configured lists, such as query list 724, options list 722, and functions list 720. List 722 changes accordingly to the subscriber's selection of a respective entry in query list 724. Hence, the options list 722 changes to a display corresponding to price-per-duration displays upon the subscriber selecting the price entry in query list 724. Each of these pre-configured lists includes information within a series of windows 725. The information in these lists will preferably be defaulted to the selection corresponding to the shown highlighted window 726 of each list based on the characterizing information corresponding to the BC service selection. Other embodiments are possible, such as a configuration screen (not shown) wherein the user categorizes the session for a BC service according to his or her own personal definitions. For a non-limiting example, query list 724 includes such queries for a session of a BC service as availability, price, and duration, as well as more query options not shown. The default selection highlighted by highlighted window 726 corresponds to the fact that a user can query about a plurality of price options for the selected BC service, i.e. Tae Bo as a non-limiting example. Options list 722 defaults to "$20 for 15 min as this corresponds to the least-expensive available option of the Tae Bo BC service. Although these are default selections, the user is free to scroll the highlighted window 726 of each list to enter his or her desired query. As with any of the lists shown and described on the current and subsequent screens, the user may advance from one window to the next window within a list by using the up and down arrow keys of the remote control device, as suggested by up arrow 730 and down arrow 734. There are many variations of the advancing function. Preferably, the user advances highlighted window 726 in each list up or down to highlight the entry in window 725 containing the information desired. Alternatively, the windows in each list may be advanced through highlighted window 726. The preferred embodiment of the invention is not limited to how the user advances to each window 725. The user advances from one list, for a non-limiting example query list 724, to another list, for a non-limiting example options list 722, by using scroll arrows on the remote, as suggested by scroll arrows 736. Scroll arrows 736 and 738 correspond to scroll arrows located on a remote device. Category display 712 includes one example default format based on characterizing information corresponding to the selected BC service. In this non-limiting example, since Tae Bo is a "Physical Fitness" BC service, the category display 712 lists "Physical Fitness." Alternate formats may be displayed as well, such as personalized formats created by the user. The scope of the embodiments of the invention is not limited by how data is formatted on the screen displays.

The effective window of calendar days in which a respective BC service is purchasable is displayed within service information window 710. Alternatively or in addition, it may be included as an entry in query list 724 in which upon selection respective options list 722 displays an entry for start time and another entry for end time.

Once a user has selected a price from option list 722 for a session of the Tae Bo BC service, the user can proceed to record the session in a VCR device or storage device attached to DHCT 16 by advancing from option list 722, to functions list 720, by using scroll arrows on the remote, as suggested by scroll arrows 738. A BC service may entitle a session to be recorded or not recorded. In the even that a BC service does not allow session recording, "set record" will not appear as an entry in function list 720.

Recording of BC service's session may be allowed for an extra price. In one embodiment, a purchasable record option appears as an entry in function list with a price, as a non-limiting example, as "set record $5." In an alternate embodiment, option list 722 will include price-options entry indicating price for duration and recording as well. For example, the "$25 (Rec) for 15 min" may indicate to the user the price for the Tae Bo BC service for a 15 minute session that is recordable.

An option for a BC service purchase constitutes a package purchase option in options list 722. In the non-limiting example in FIG. 7, multiple sessions of the Tae Bo can be purchased for a fee. For example, a user may opt to purchase four 30-minute sessions of a BC service for a discounted price. A first session can be impulsively instigated and the three remaining sessions can be scheduled by navigating through a series of menus or lists in the hierarchy of a session purchase GUI.

Upon selection to "wake on availability," the user selects to be notified when a service not currently available becomes available. The user may presented with a displayed pop-up message in the future, while continuing to watch a program television or to consume a second service, that notifies the viewer that a first requested service not previously available has become available.

A user can also set a reminder timer for a session purchased for a future time slot via function list 720.

In FIG. 7, the "A", "B", and "C" buttons on the remote 480 may be used to provide certain user interface functionality, as suggested by the corresponding buttons on the example display screen. For instance, "A" button 740 enables a user to request more information about a BC service, such as a more thorough description or reviews from other individuals (note: needs claimed). The "B" button 742 provides for enacting the purchase of a session at future periods other than the set of near-term periods presented in the options list when availability is selected in the query list. Return Button 744 will return the user to the screen display from where session purchase screen 700 was entered, for example a BSPG screen, by way of non-limiting example. The "SEL" button 732 enables the user to enact the purchase functionality once all desired options and functions have been selected. Buttons "A"-"C", arrow buttons 730, 734, 736 and 738, and "SEL" button 732 suggest a one-to-one functional correspondence to similar buttons on a remote device, such as that illustrated as a non-limiting example in FIG. 8.

FIG. 8 illustrates a non-limiting example of a remote control device 480 that is used to provide user input to the DHCT 16. The arrow buttons 882 include an up arrow button 883, a down arrow button 884, a left arrow button 885, and a right arrow button 886 that are used to scroll through options or selections and/or to highlight an option or selection displayed on one of the plurality of user interface screens. The select button 887 may be used to select a currently highlighted option or selection that is provided to the user. Lettered button "A" 888, "B" 889, and "C" 890 may be used to implement functions on a user interface screen that have the corresponding letter. Numeric buttons 895 may be used to enter numbers, or configured with the application to enter letters corresponding to the numeric buttons 895. In describing the example screen displays, it will be understood that "selecting" or "pressing" the navigational and lettered buttons on the screen actually require selecting the corresponding remote control device buttons. Many alternative methods of providing user input may be used including a remote control device with different buttons and/or button layouts, a keyboard device, a voice activated device, etc. The embodiments of the invention described herein are not limited by the type of device used to provide user input.

In another embodiment, the icon B 742 of FIG. 7 represents a search operation. FIG. 9 is an example archive search screen 900 responsive to the user selecting the "B" search button 742 in session purchase screen 700 or in the BSPG presentation 670 of FIG. 6. Note the change in the subtitle header 902 reflecting the current screen purpose. Search window 924 enables the user to enter alphanumeric characters to search for BC service or other characterizing information within the BSPG database 478. The user may enter the name of a BC service, or any of the BSPG information and the result display 912 will display the information found pertaining to one or more BC services upon completion of a search operation in the BSPG database 478.

A user may access the BSPG presentation 670 in several ways. With reference again to FIG. 8, a remote unit 480 is shown with a dedicated key to access the BSPG presentation 670. The navigator 455 on the DHCT 16 may be configured to activate the BSPG presentation 670 whenever the user presses the GUIDE key 881 on the remote 480. The user may navigate the BSPG presentation 670 by pressing the arrow keys to move the cursor 678 of the BSPG presentation 670 to the desired selectable bi-directional service link 676. Once the user moves the cursor 678 to the desired target service or application, the user presses the SEL key 887 to select the selectable service link 676 corresponding to that target service. If the user desires to exit the BSPG presentation 670, the DHCT 16 may be configured to remove the BSPG presentation 670 and return to the current TV program if the user presses the GUIDE key 881 a second time or the EXIT key 891. It will be clear to one of ordinary skill that virtually any key on the remote 480 may be configured to activate the BSPG presentation 670. Similarly, it will be obvious that the remote 480 may be any type of corded or wireless remote or keyboard or other input devices. Other input commands can be received as signals in DHCT 16 by alternate means of receiving input, including voice signals and signals received via a communication port in DHCT 16.

In one embodiment, the a user can press the "info" button 892 in order to cause the remaining time for a purchased service to be displayed in a non-obtrusive manner on the television screen. For instance, the remaining time may be displayed on the bottom of the television screen regardless of whether the service presentation is active or in stop mode.

The BSPG presentation 670 may also be activated by the user upon entering a channel input corresponding to the BSPG service, as defined by the system operator. FIG. 10 is a diagram of the mappings of services to channels wherein the BSPG presentation 670 is mapped to a channel of the channel table 1001. The system operator at the headend 11 configures the assignment of services to channels. The channel table 1001 is a list of all channels in the cable television system, and the bi-directional service table 1002 is a list of all available services or applications provided by the cable television system. The system operator configures the channel line-up by setting the various channels in channel table 1001 to point 1003 to the various service or application in the bi-directional service table 1002. A channel in the channel table 1001 may point 1005 to the BSPG, provided by the BSPG client application 477, so that the BSPG presentation 670 is displayed whenever the user selects that channel. Thus, in a non-limiting example, the BSPG presentation 670 is presented to the user upon the DHCT 16 receiving a command to display channel 1. Consequently, the BSPG presentation 670 is presented if the user inputs a channel 1 command or merely scrolls through the channels and stops on channel 1.

FIG. 11 is a screen display diagram of a combination presentation of an interactive program guide (IPG) display 1100 that includes a BSPG presentation 670. The IPG display 1100 presents current and future viewable programs to the user in a scrollable format based on channel and time. The user may navigate the IPG display 1100 to select a current program for immediate viewing. The IPG display 1100 is a vertically scrollable list of channel numbers in a channel portion of the display 1101 and a horizontally and vertically scrollable program listing display 1103 of program services, including bi-directional services, corresponding to the respective channels in the channel portion of the display 1101.

In FIG. 11, the user navigates a cursor 1105 in the program listing display 1103 to select the individual program or service for activation. The user in similar fashion may activate bi-directional services by moving the cursor 1105 to the bi-directional service listing in the program listing display 1103. Alternatively, a separate program guide, devoted exclusively to bi-directional content, may be listed as a separate channel. In the disclosed embodiment of FIG. 11, a BSPG is listed as channel 1 and may be accessed by moving the cursor 1105 over channel 1 and selecting it with the remote 480. In still another example, the BSPG may be a separate guide from the IPG display 1100 entirely and may be accessed via separate buttons from the remote 480.

FIG. 12 is a screen display diagram of another embodiment of a BSPG presentation 670. In this embodiment, channels akin to those used in the more traditional IPG displays replace the bi-directional service links 676. A bi-directional services menu 1200 lists those services available to the subscriber at a given time. Note that the selectable services are arranged in a vertical format such that the subscriber can scroll vertically to view the offered services currently showing on the various channels. Alternatively, the subscriber can scroll horizontally and view the services available at different times on the same channel. As described above, the BSPG presentation 670 may be a separate guide from the IPG display 1100 or may be an option that the user can select from the IPG display 1100.

FIG. 13 is a screen display diagram of another embodiment of a BSPG in a full screen format. In this embodiment, the BSPG presentation 670 includes a date and time field 673, a list of channels carrying bi-directional services 680, a description of the bi-directional services offered 674, an availability indicator 675 and a next available session indicator 677. In a preferred embodiment, some of the bi-directional services may be subscription-based and the program guide can use different colors and/or textures to distinguish between free and subscription-based services. Alternately, colors and textures can be used to distinguish between types of services offered (audio only, video only or both) or service content (family services versus adult entertainment). These examples are for illustration purposes only and it will be readily apparent to one of ordinary skill in the art that any of the attributes stored in the BSPG database 478 can be graphically distinguished in the BSPG presentation 670. Moreover, the methods used to distinguish between service attributes may be selected by the cable system operator or may be user customizable.

In a preferred embodiment, if a user selects one of the listed bi-directional services the user will receive another BSPG presentation 670 showing the sessions available for the selected service. FIG. 14 is a screen display diagram showing the sessions available to a subscriber that has selected Bally's Exercise Routines from the services listed in FIG. 13. The BSPG presentation 670 of FIG. 14 includes a bi-directional services session list 682 that shows the various sessions available from the selected bi-directional service. For each session, the availability indicator shows the user whether a given bi-directional service session is currently available and, if not currently available, a next available session indicator 677 indicates when the session will next be available. In a preferred embodiment, if a user attempts to select a session that is not currently available, the user will receive a audio or visual message indicating that the selected service is not available. Alternatively, unavailable sessions will be listed as "grayed out" and are not selectable.

From FIG. 14, a user may scroll through the available sessions within the selected bi-directional service. In a preferred embodiment, the user has the option of pressing the INFO button 892 of the wireless remote device 480 to obtain additional information about each session.

FIG. 15 shows an exemplary BSPG session information page 685 that includes a detailed description of the offered bi-directional service session 687 and a session fee structure 689. At the bottom of the screen, the user has option to purchase the bi-directional service session via the purchase service button 690 or to return to the previous screen 691.

In one embodiment, as illustrated in FIG. 16, the user is presented with an interactive program guide (IPG) 1670 which has BC icons next to varied media selections, suggesting to the user the availability of a selectable BC service. For a non-limiting example, selections Tae Bo under the PPV category 1676 have "BC" next to them suggesting to the user that these selections are available for session purchase. In another embodiment, the user may be presented with a service guide (SG) option 1776 in the example IPG 1790 depicted in FIG. 17. Upon selecting the service guide (SG) option 1776, the user is presented with service selections in a service guide (SG) as illustrated in FIG. 18.

FIG. 18 is an example user service guide (SG) that provides for a plurality of services 1856 with BC icons to alert the user to the ability (or inability) to purchase a BC service session. Alternatively, the BSPG service 1975 may be a selectable service entity, as illustrated in FIG. 19. Selecting the BSPG service 1975 from the service guide 1950 may present various BC services that are purchasable, categorized, by way of non-limiting example, by BC service categories such as adult entertainment, personal education, personal advice, etc.

Once the user has decided on a BC service selection, either by entering a selection in an IPG, a service guide, or during a particular GUI presentation, the user is presented with an example session purchase screen 2000, as illustrated in FIG. 20.

BC services under the "adult" category, such as, for example, a feature Suzie Floosey displayed in the display of a an adult BC service in a BSPG or EPG GUI presentation, are displayed with a lock or PIN icon next to it to reflect PIN access authorization to view this media presentation. The PIN access entry icon may be displayed as a result of the user entering a first PIN access number to allow session purchases of BC services comprising communication of adult material, in accordance with the rating of the BC service. Alternative icons or warning notices or messages alerting the user to PIN access entry requirements may also be employed.

FIG. 21 depicts an example PIN entry window 2100 that is presented to the user after the user selects to purchase a session for a BC service example session purchase screen, 2000 of FIG. 20. A PIN Entry window 2100 is employed during the purchase of a session for a BC service to authenticate authorization to purchase and exercise parental control of purchases. The top portion 2110 contains the heading "PIN ENTRY" while the bottom portion 2120 illustrates relevant navigation buttons available on the remote control device 480. A user can enter his or her PIN using the remote control device 480 while being presented with the PIN entry window 2100. Center portion 2130 contains entry fields 2140 that display a "*" for every PIN entry received from the user. In an alternative embodiment a user is not presented with a PIN entry screen and is not required to enter a PIN. In yet another alternative embodiment, a user is only presented with a PIN entry screen if a session for the selected BC service can be achieved.

In the described embodiment, the user can purchase a bi-directional service from any of the aforementioned GUI presentations. If the selected service is free, the user's selection activates the server using the process already described. If, on the other hand, the selected service is subscription-based the user will receive a confirmation screen of the type shown in FIG. 20.

The BSPG presentation 670 is additionally configurable to control the behavior and presence of the bi-directional services links 676 based on the parental control status of the DHCT 16 as maintained by the navigator 455 application. Service parental control information is available to the BSPG client application 477 via the navigator 455. If the "display_mode" is "active," the service link 676 is selectable (shown active) even if the service is blocked. Thus, the user may select the service link 676 to the target service, but the BSPG presentation 670 will display a pop-up barker indicating that the service is not available because it has been blocked by parental control. If the "display_mode" is set to "inactive," links to bi-directional services that are blocked by parental control are displayed to the user in a "grayed out" format so that the user may see the service link 676 but may not select the link label 676 for activation of the underlying target service. Finally, if the "display_mode" is set to "none," links to services that are blocked by parental control are not included in the BSPG presentation 670.

Either the system operator of the cable television system or the user of the DHCT 16 may configure the display status of bi-directional service links 676 with respect to parental control status of the target service. The system operator may designate the display status with respect to service blocking status by a GUI that graphically configures the BSPG presentation 670. More likely, the user, through a settings menu (not shown), may configure the BSPG presentation 670 so that the display mode of one or more service links 676 is "inactive" or "none" so the display of the selectable graphic conforms to the display modes described above. Alternatively, the user can configure the BSPG presentation 670 by calling the automated phone menu system, logging on to a specified secure and encrypted web site, or navigating through a configuration application running in the user's DHCT 16 as described above.

To offer BSPG service, in one implementation, the subscriber network television system operator assigns a portion of the downstream and upstream bandwidth capacity in the subscriber network television system to be dedicated for transmission of BC services. The amount of bandwidth capacity that can be allocated to the BSPG service is finite. Grants for request to fulfill a session for a BC service may be limited during peak-time periods that correspond to high bandwidth consumption by a plurality of other services. On the other hand, off-peak-time periods may feature unused bandwidth capacity intended for other services that can be repossessed for effecting BC service sessions.

In one embodiment of the invention, the amount of bandwidth capacity allocated for BC services varies throughout time to reflect bandwidth consumption by a plurality of bandwidth consuming services, including but not limited to VOD services. During peak periods of other bandwidth consuming services such as, for a non-limiting example, VOD, the amount of bandwidth capacity allocated to the BC services is less than during the off-peak periods. Consequently, the number of available BC services during peak-periods may less than during off-peak periods. Lower bit rates resulting in lower picture quality (e.g., lower quality of service) may need to be effected for BC services during peak periods. Pricing for each respective BC service session may or may not vary according to whether the time interval for a purchase session is a peak period or not.

As a non-limiting example, during peak periods, such as 6:00 to 10:59 P.M. of the week nights, a BC service may exhibit higher pricing whereas during certain, low-demand time periods such as 6:00 to 11:00 A.M of the weekend days the pricing will be lower. Other factors such as demand for a BC service and its popularity may also influence pricing. Therefore, pricing for a BC services may be configured to adapt in a time-specific manner according to a plan and according to such other factors.

Other factors influencing pricing of a BC service include the service content type (e.g., audio, video, and/or data), the session quality (e.g., CD quality or surround sound quality audio; and low bit-rate versus high bit-rate picture quality).

The allocation of system resources such as bandwidth for BC services may be configured to switch as time progresses from a first allocation sub-schedule to a second allocation sub-schedule according to a main schedule that specifies the time interval when each of two or more sub-schedules is to be active as illustrated in FIG. 22. As noted in FIG. 21, the plan may consist, in one embodiment, of scheduling with multiple schedules 2210, on a per week basis 2220, administered with a plurality of sub-schedules on a daily basis 2230 (or alternatively weekly basis). In this embodiment, only one configurable sub-schedule is active at a time throughout the configurable recurring schedule but a first configurable sub-schedule may be active throughout one or more distinct and non-overlapping time intervals of the configurable recurring schedule. The recurrence of the schedule is configured to one of a plurality of time periods such as a weekly, daily, or a monthly recurring schedule.

According to another possible bandwidth allocation schedule, a multiplicity of time-adaptive schedules for each of a multiplicity of recurring schedule choices are pre-configured. In this embodiment, the cable system operator may monitor the bandwidth and BC service usage and be given the option of manually implementing one of the pre-configured allocation schedules without following a plan.

Alternatively, the DNCS 323 may automatically monitor bandwidth usage and automatically select one of the pre-configured. For instance, six different configurations may be available for time-adaptive management of the bandwidth allocated for BC services for a daily recurring schedule. On the other hand, more than six different arrangements may be necessary when implementing time-adaptive bandwidth management on a weekly recurring schedule.

The pricing system and the allocated bandwidth are inherently related, as the price structure will depend on, among other factors, the time of the BC service session and the duration. In a subscriber network television system that markets BC services with a plurality of prices, a first subscriber may be willing to pay a premium to immediately effect a session of a BC service that is purchased during a peak-period. A second subscriber pays a lesser purchase fee when purchasing a BC service during a peak-period but selecting to schedule the session at a later time corresponding to an off peak-period. In the preferred embodiment, the BSPG service offers a plurality of prices for a BC service session, each respective price is associated with a different combination duration, recording rights, session start time, and picture quality. The BSPG presentation 670 may allow configurability by the user so as to include one or more favorite bi-directional services so designated by the user to appear in the BSPG presentation 670. While the system operator may configure one or more selectable bi-directional service links 676 to always be presented in the BSPG presentation 670, the system operator may configure the BSPG presentation 670 to display selectable bi-directional service links 676 to services chosen by the user for incorporation in the BSPG presentation 670.

The BSPG presentation 670 may be configured to additionally display a selectable bi-directional service link 676 to services or channels in a time-specific manner. The BSPG presentation 670 may be configured to switch as time progresses from a first configurable BSPG presentation 670 to a second configurable BSPG presentation 670 according to a schedule that specifies the time interval when each of two or more respective BSPG presentations 670 is to be active. Two or more from a multiplicity of configurable BSPG presentations 670 are configured to be active for one or more intervals of time in a recurring schedule. Only one configurable BSPG presentation 670 is active at a time throughout the configurable recurring schedule but a first configurable BSPG presentation 670 may be active throughout one or more distinct and non-overlapping time intervals of the configurable recurring schedule. The recurrence of the schedule is configured to one of a multiplicity of choices such as a weekly, daily, or a monthly recurring schedule.

In an embodiment, the system operator configures a multiplicity of time-adaptive BSPG presentations 670 for each of a multiplicity of recurring schedule choices. For instance, the system operator may configure six different arrangements to choose from for users that opt for a time-adaptive service guide on a daily recurring schedule. On the other hand, the system operator may configure more than six different arrangements to choose from for users that opt for a time-adaptive service guide on a weekly recurring schedule.

In another embodiment, in addition to having the choice of selecting one of a multiplicity of time-adaptive BSPG presentations 670 pre-configured by the system operator, the user can additionally configure a time-adaptive BSPG presentation 670 according to the user's preference for a user-selected recurring schedule from the set of recurring schedule choices. The user can enter his or her preferences through an interactive configuration session in the DHCT 16 or in alternate embodiments by calling the automated phone menu system or logging on to a specified secure and encrypted web site as described above.

In an embodiment, a time-adaptive BSPG presentation 670 running a weekly recurring schedule may include selectable bi-directional service links 676 to, for example, personalized traffic and/or weather services for one or more specific time intervals (e.g., 7:30 to 8:00 A.M. and/or 11:00 to 11:30 PM for personalized news; 1:00 to 5:00 PM for personalized financial services) during weekdays. During weekends, the weekday selectable bi-directional service links 676 become inactive. Examples of selectable service links for weekends might include visual chat rooms or exercise classes.

The BSPG presentation 670, which comprises an ordered listing of selectable services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A method for accessing a plurality of bi-directional services that are transmitted over a cable television network, comprising:

presenting a program guide to at least one subscriber, the program guide comprising at least one bi-directional service including availability information for each of the at least one bi-directional service, wherein the availability information includes one of available or unavailable;

receiving a request for a bi-directional service displayed in the program guide;

determining a current bandwidth consumption, availability of the requested bi-directional service, and a schedule including bi-directional service rights for each subscriber;

dependent upon the determining step, rendering the bi-directional service, comprising the steps of:

maintaining real-time communications between a supplier of the requested bi-directional service and a requesting subscriber; and monitoring the real-time communications by a bi-directional services server;

updating a bi-directional services database to reflect that the rendered bi-directional service is one of available or unavailable; and populating and presenting an updated program guide with the at least one bi-directional service and updated availability information, wherein the at least one bi-directional service is maintained in and periodically updated in the program guide by the bi-directional services database.

2. The method of claim 1, further comprising the steps of receiving a request for further information regarding the requested bi-directional service and transmitting the information to the requestor, wherein the information comprises at least one of description of the bi-directional service, supplier name, rating, duration, availability times, pricing, calendar window comprising a start date and an end date, and geographical location of the supplier.

3. The method of claim 1, further comprising the step of querying the bi-directional services database to ensure the requested bi-directional service is available, and if available, querying the schedule including bi-directional service rights for each subscriber, wherein the rights for a bi-directional service include at least one of bandwidth allocation, duration, recording rights, start time, and picture quality.

4. The method of claim 1, wherein receiving a request from a subscriber for a bi-directional service comprises at least one of a bi-directional communication session between the subscriber and at least one other subscriber associated with the requested bi-directional service, a bi-directional communication session to purchase a viewable option of the requested bi-directional service; or a bi-directional communication session to purchase a recordable option of the requested bi-directional service.

5. The method of claim 1, further comprising the steps of:

receiving a second request for an available bi-directional service displayed in the program guide;

determining the current bandwidth consumption;

dependent upon the determined bandwidth consumption, transmitting the second requested bi-directional service;

updating the availability information in the bi-directional services database; and presenting an updated program guide including the second requested bi-directional service availability information.

6. The method of claim 5, further comprising the steps of:

if a displayed bi-directional service is not available due to the unavailability of the bi-directional service, receiving a schedule request for future consumption of the requested bi-directional service; and if a displayed bi-directional service is not available due to the current bandwidth consumption, receiving a request for one of future consumption of the requested bi-directional service at a first price or a request for immediate consumption of the requested bi-directional service at a second price.

7. The method of claim 6, further comprising the step of providing notification when the bi-directional service is available, wherein the notification of the previously unavailable bi-directional service comprises displaying a notice on a currently displayed program.

8. The method of claim 1, further comprising the step of continuously updating the bi-directional services in the program guide to display availability information for each of the plurality of bi-directional services.

9. A system for accessing a plurality of bi-directional services over a cable television network comprising:

means for receiving availability information from at least one remote supplier related to a plurality of bi-directional services;

means for populating a bi-directional services database with the availability information related to the plurality of bi-directional services;

means for presenting a program guide to a plurality of subscribers, wherein the program guide displays the plurality of bi-directional services along with the availability information;

means for receiving a request from at least one of the plurality of subscribers for at least one available bi-directional service displayed in the program guide;

means for determining a current bandwidth consumption and bi-directional service rights of the requesting subscriber, wherein the bi-directional service rights for a bi-directional service include at least one of a duration, recording rights, start time, end time, bandwidth, and picture quality;

dependent upon the current bandwidth consumption and the bi-directional service rights, means for enabling a bi-directional communication session between at least one of the plurality of subscribers and a remote supplier based on the requested bi-directional service;

means for rendering the available bi-directional service, wherein real-time communications is established between the remote supplier and the at least one of the plurality of subscribers, and wherein the real-time communications between the remote supplier and the at least one of plurality of subscribers is monitored by a bi-directional services server;

means for generating an updated bi-directional services database to reflect that the requested at least one bi-directional service has been rendered and is one of available or unavailable; and means for retransmitting the program guide including the updated bi-directional services to the plurality of subscribers.

10. The system of claim 9, wherein the updated bi-directional services database is updated by information received from the at least one remote supplier.

11. A method for accessing a plurality of bi-directional services that are transmitted over a cable television network, comprising:

presenting a program guide to at least one subscriber, the program guide comprising at least one bi-directional service including availability information for each of the at least one bi-directional service, wherein the availability information includes one of a user-selectable available option or unavailable option presented in the program guide, the bi-directional service including audio and video communicated between a subscriber and a remote server and a content provider across a hybrid-fiber coax network;

receiving a request for a bi-directional service displayed in the program guide;

determining a current bandwidth consumption and availability of the requested bi-directional service;

dependent upon the determining step, rendering the bi-directional service;

updating a bi-directional services database to reflect that the rendered bi-directional service is one of available or unavailable; and populating and presenting an updated program guide with the at least one bi-directional service and updated availability information, wherein the at least one bi-directional service is maintained in and periodically updated in the program guide by the bi-directional services database.

* * * * *